(12) United States Patent
Sasaki et al.

(10) Patent No.: US 6,238,541 B1
(45) Date of Patent: May 29, 2001

(54) FILM-FORMING METHOD AND METAL MATERIAL

(75) Inventors: Motohiro Sasaki, Kawasaki; Katsutoshi Nagai, Yonezawa; Katsuaki Yoshioka, Nerima-ku, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/232,644

(22) Filed: Jan. 19, 1999

(30) Foreign Application Priority Data

Mar. 30, 1998 (JP) .................................................. 10-084467

(51) Int. Cl.$^7$ ............................... C25D 5/34; B05D 3/10; B05D 1/02; B05D 1/18; B05D 1/28
(52) U.S. Cl. .......................... 205/211; 205/210; 205/147; 427/240; 427/327; 427/421; 427/428; 427/435
(58) Field of Search ..................................... 427/327, 435, 427/421, 428, 240; 205/211, 147, 210

(56) References Cited

U.S. PATENT DOCUMENTS

| | | | |
|---|---|---|---|
| 3,865,617 | * 2/1975 | Shimizu et al. .................. | 117/132 C |
| 4,120,996 | * 10/1978 | Castellucci ............................ | 427/318 |
| 4,528,384 | * 7/1985 | Schmidt et al. ....................... | 549/78 |
| 4,839,203 | * 6/1989 | Davis et al. ........................... | 427/244 |
| 5,139,601 | * 8/1992 | Holmes-Farley et al. ............ | 156/329 |

FOREIGN PATENT DOCUMENTS 2-264756   10/1990   (JP) .

5-32618   2/1993   (JP) .

* cited by examiner

*Primary Examiner*—Shrive Beck
*Assistant Examiner*—Michael Barr
(74) *Attorney, Agent, or Firm*—Oliff & Berridge, PLC

(57) ABSTRACT

A method is provided for forming a film having excellent anticorrosion properties on a metal surface without producing sludge, and without using phosphorus or chromium. In this method, the following steps (a)–(c) are performed on a metal material: (a) degreasing, (b-1) pretreatment if necessary, and (c) which comprises the following steps (c-1) or (c-2). The film-forming step (c-1) is a step for forming a film by bringing the metal material in contact with an aqueous solution comprising at least one of the following compositions (A), (B), (C) or (D): (A) is a monomer comprising a sulfonium group at one end of the molecule. (B) is a water-soluble polymer obtained by homopolymerization or copolymerization of the monomer (A). (C) is an emulsion or water-soluble polymer comprising a sulfonium group obtained by copolymerization of the monomer (A) and a radical-polymerizable unsaturated monomer excluding the monomer (A). (D) is a composite emulsion comprising a sulfonium group wherein inorganic particle core are coated by a layer comprising a copolymer of the aforesaid monomer (A) and a radical-polymerizable unsaturated monomer excluding the monomer (A). The film-forming step (c-2) is a step for forming a film by electrodeposition wherein the metal material is dipped in an aqueous solution comprising at least one of the above compositions (A), (B), (C), (D), and a current is passed between a cathode and an anode with the metal material as cathode.

18 Claims, 3 Drawing Sheets

FILM-FORMING METHOD AND METAL MATERIAL

BACKGROUND OF THE INVENTION

This invention relates to a film-forming method, and in particular a method for forming an organic film or and inorganic/organic composite film having excellent adhesion properties and anti-corrosion properties in surface treatment of a metal material, and to a metal material on which such a film is formed.

DESCRIPTION OF THE RELATED ARTS

Conventionally, when a metal surface is coated, the surface is first degreased, surface treatment is performed and then paint is applied. In the prior art, the surface was first treated with zinc phosphate or a chromate to impart anti-corrosion properties to the metal surface and improve adhesion between the surface and the coated film on the surface.

However, in the case of zinc phosphate, the phosphorus contained in effluent may cause water eutrophication and contamination, and gives rise to sludge in the surface treatment bath. On the other hand in the case of chromate treatment, the chromium in wash water is harmful, and can have a detrimental effect on the environment and human beings. This requires expensive waste water treatment equipment, which was rather uneconomical.

In recent years, therefore, there has been a need for a film-forming method which does not use surface treatment fluids containing harmful materials such as phosphorus or chromate, does not produce sludge, but which confers excellent anti-corrosion properties.

The following light curing composition having the general formula (II) shown below is disclosed in "Radiation Sensitive Ethylenic Unsaturated Sulfonium Salts Capable of Copolymerization", Japan patent laid-open publication No. 2-264756.

$$[(R)_a(R^1)_b(R^2)_cS^{\oplus}]A^{\ominus} \quad (II)$$

(in the formula, R is a monovalent aromatic group which may or may not be substituted, $R^1$ is a monovalent organic aliphatic group which may or may not be substituted, and is one group chosen from alkyl, cycloalkyl and substituted alkyl groups, $R^2$ is a bivalent or trivalent aliphatic or aromatic organic group which may or may not be substituted and which has a complex ring structure or a condensed ring structure.

a is an integer from 0 to 3 (including 3), b is an integer from 0 to 2 (including 2), c is an integer equal to 0 or 1, such that a+b+c=3.

$A^-$ is an acid anion.

At least one of R-$R^2$ contains one of the groups shown below in combination:

$$-O-W-X-Z-\underset{\underset{O}{\|}}{C}-\underset{Y}{C}=CH_2 \text{ or}$$

$$-O-W-X-Z-CH=$$

W in the formula is a single bond or one of the groups shown below:

$$-\underset{\|}{\overset{O}{C}}-, \quad -\underset{\|}{\overset{O}{C}}-O-, \quad -\underset{\|}{\overset{O}{C}}-S-,$$

$$-\underset{\|}{\overset{O}{C}}-NH-, \quad -\underset{\|}{\overset{O}{C}}-N\text{(alkyl)}-, \quad -\underset{\|}{\overset{S}{C}}-,$$

$$-\underset{\|}{\overset{S}{C}}-S-, \quad -\underset{\|}{\overset{O}{S}}-, \quad -\underset{\underset{O}{\|}}{\overset{O}{\underset{\|}{S}}}-, \quad -\underset{\underset{O}{\|}}{\overset{O}{\underset{\|}{S}}}-O-,$$

$$\overset{O}{\underset{\|}{P}}- \text{ or } \overset{S}{\underset{\|}{P}}-$$

X in the above formula is a bivalent alkylene group having the structure shown below which may or may not be substituted, $$-(CH_2)_m-, \quad \left[-\underset{R''}{\overset{R'}{\underset{|}{C}}}-\right]_m \quad [m = 1 \sim 10]$$

R' and R" are identical or different aryl, $C_1$–$C_4$ alkyl, H, COOH, COOCH$_3$, COOCH$_2$CH$_3$ groups or, perfluoroalkylene groups —(CF$_2$)$_m$(m=1–10), oxyalkylene groups —(CH$_2$)$_n$—O—(CH$_2$)$_p$— (n=1–5 and p=1–5), perfluorooxyalkylene groups, one of the following polyoxyalkylene groups which may be perfluorinated comprising 2–20 oxygen atoms, these oxygen atoms being linked via at least one —CH$_2$—, —CF$_2$or —CH$_2$—CH(CH$_3$)— group, —(CH$_2$)$_m$—O—CO—O—(CH$_2$)$_n$—, —(CH$_2$)$_m$—O—CO—NH—(CH$_2$)$_n$—, —(CH$_2$)$_m$—NH—CO—O—(CH$_2$)$_n$—, —(CH$_2$)$_m$—O—CO—(CH$_2$)$_n$— or —(CH$_2$)$_m$—CO—O—(CH$_2$)$_n$— (m=1–10, n=1–10), or a phenylene group substituted in the o-, m- or p- positions by an alkyl group comprising 1–4 carbon atoms, OH, OCH$_3$, OC$_2$H$_5$, SH, SCH$_3$ or SC$_2$H$_5$.

Y is hydrogen, an alkyl or phenyl group comprising 1 to 6 carbon atoms, and Z is O or NY.

In "A Novel Acrylate Compound" in Japan patent laid-open publication No. 5-32618, a novel acrylate derivative having the structure shown below is disclosed as starting material of a functional polymer used as a carrier for clinical diagnosis agents.

$$\underset{}{\overset{R}{\underset{|}{CH}}}=\underset{}{\overset{R_1}{\underset{|}{C}}}-\underset{\|}{\overset{O}{C}}-O-\underset{R_3}{\underset{\|}{\overset{R_2}{\bigcirc}}}-\underset{R_5}{\overset{R_4}{\underset{|}{S^+}}} \quad X-$$

(in the formula, R is hydrogen, a $C_1$–$C_4$ alkyl group or a phenyl group, $R_1$ is hydrogen or a $C_1$–$C_4$ alkyl group, $R_2$, $R_3$ are separately hydrogen, halogen or $C_1$–$C_4$ alkyl groups, $R_4$, $R_5$ are separately $C_1$–$C_4$ alkyl groups, X is an alkyl sulfate ion, halogen ion, perchlorate ion, bisulphate ion or p-toluenesulfonic ion.

U.S. Pat. No. 4,528,384 describes ethylenic unsaturated aromatic sulfonium salts having for example the structure shown below as starting materials for new polymers used as cationic surfactants.

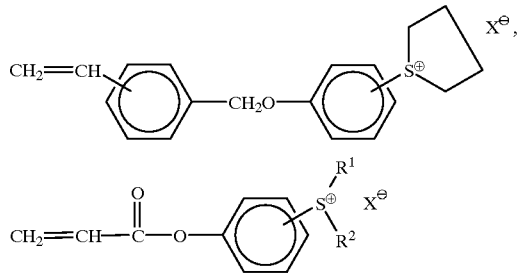

(in the formula, $X^\ominus$ is an anion such as $Cl^-$ or $CH_3COO^-$).

However, all of the ethylenic unsaturated aromatic sulfenium salts described in the aforesaid Japanese patent laid-open publication No. 2-264756, Japanese patent laid-open publication No. 5-32618 and U.S. Pat. No. 4,528,384 are used as light curing compositions, as carriers for clinical diagnosis agents or as cationic surfactants, and there are no examples of their use as surface treatments prior to the painting of metal materials.

Until now, no method had been found for forming an organic film or organic/inorganic film on a metal surface, and treatment of metal surfaces had to be performed while taking precautions against environmental pollution and sludge prevention. This required costly effluent treatment equipment and metal surface treatment equipment, which was uneconomical.

SUMMARY OF THE INVENTION

It is therefore an object of this invention, which was conceived in view of the above problems in the prior art, to provide a method of forming an organic film or an organic/inorganic composite film having excellent adhesive properties and anticorrosive properties on a metal surface in the surface treatment of metal materials.

To achieve the above object, the film-forming method according to this invention is a method comprising a film-forming step wherein a film is formed by bringing an aqueous solution comprising at least one of the following compositions (A), (B), (C) or (D) into contact with a metal material.
(A) A monomer comprising a sulfonium group at one end of the molecule,
(B) A water-soluble polymer obtained by homopolymerization or copolymerization of the monomer (A),
(C) An emulsion or water-soluble polymer comprising a sulfonium group obtained by copolymerization of the monomer (A) and a radical-polymerizable unsaturated monomer excluding the monomer (A),
(D) A composite emulsion comprising a sulfonium group wherein inorganic particle core are coated by a layer comprising a copolymer of the aforesaid monomer (A) and a radical-polymerizable unsaturated monomer excluding the monomer (A).

In another film-forming method according to this invention, the aforesaid monomer (A) is a monomer comprising a sulfonium group at the end of the molecule, and having the following general formula (a).

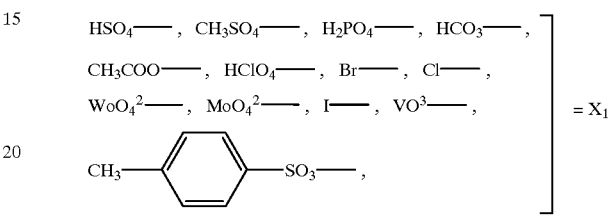

(in the formula, Y is an aromatic ring comprising a benzene ring, a naphthalene ring or a pyridine ring having a polymerizable unsaturated group and/or active hydrogen, and/or a straight chain or branched aliphatic group having a polymerizable unsaturated group and/or active hydrogen, W is a sulfonium group and X is a counter anion shown by the following formulae).

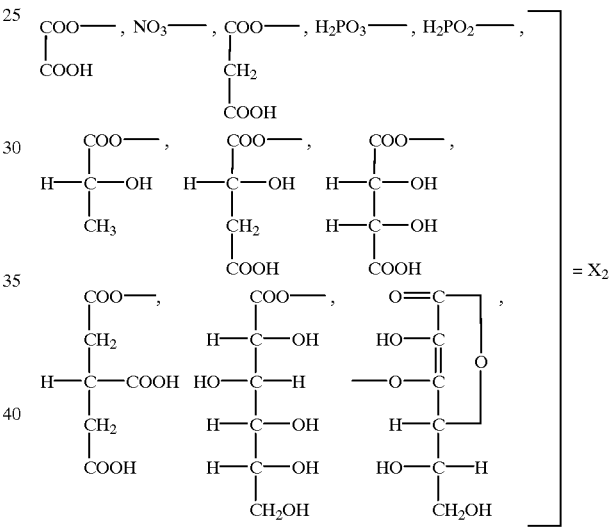

The sulfonium group in the aforesaid compositions (A), (B), (C) or (D) of the film-forming step is highly reactive to metals, and as it is a cation, the sulfonium group arranges itself on the metal surface when a metal material is brought in contact with it by, for example, spraying, spin coating, roll coating, bar coating, dipping or electrolysis during dipping, and removes an electron pair from the metal surface to form a metal-S bond. This permits an organic film or organic film/inorganic film to be formed on the metal surface comprising the aforesaid compositions (A), (B), (C) or (D), and having excellent adhesive properties and anticorrosive properties.

Further, in another film-forming method according to this invention, the monomer (A) is a monomer having the general formula (I) comprising a sulfonium group at one end of the molecule, and an active ester group in the same molecule.

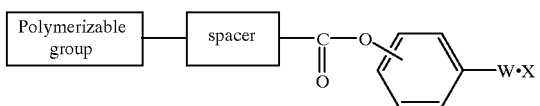

(I)

(in the formula, W is a sulfonium group and X is the counter anion $X_2$ shown above).

The active ester of the monomer (A) is a highly reactive functional group which reacts rapidly at normal temperature with —OH groups on the metal surface. Hence in addition to the above film-forming techniques, in some cases, an organic film or organic film/inorganic film may be formed on the metal surface comprising the aforesaid compositions (A), (B), (C) or (D), and having excellent adhesive properties and anticorrosive properties, by having the active ester group react with —OH on the metal surface to form a —CO—O bond.

DETAILED DESCRIPTION OF THE INVENTION

Figure 1:
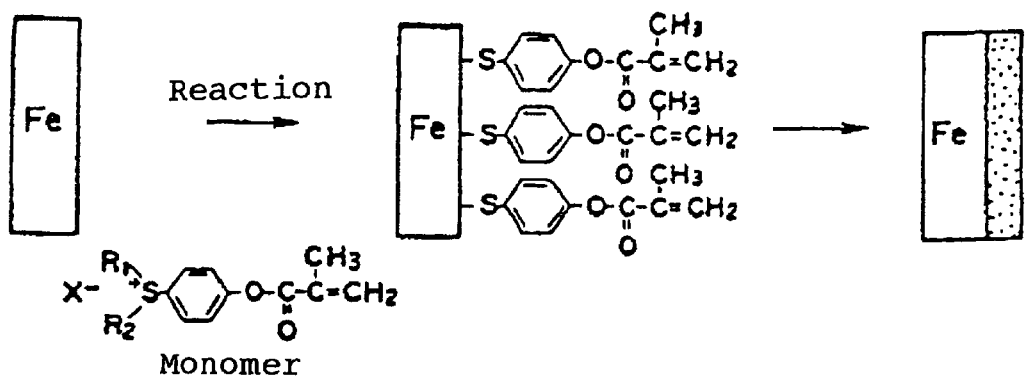
FIG. 1 is a diagram describing a film-forming method using the composition (A) in a film-forming step (c) of Embodiments 1–3, 5 of this invention.

Film-forming Method:

The film-forming method of this invention will now be described in detail with reference to specific Embodiments.

Embodiment 1

As stated hereabove, the film-forming method of this invention is a method wherein the following steps (a)–(c) are performed on a metal material: (a) degreasing, (b-1) pretreatment with an inorganic acid, oxycarboxylic acid compound, and (c) which comprises the following steps (c-1) or (c-2).

The film-forming step (c-1) is a step for forming a film by dipping in an aqueous solution comprising at least one of the following compositions (A), (B), (C), (D), or by spraying, spin coating, roll coating or bar coating.

(A) is a monomer comprising a sulfonium group at one end of the molecule.

(B) is a water-soluble polymer obtained by homopolymerization or copolymerization of the monomer (A).

(C) is an emulsion or water-soluble polymer comprising a sulfonium group obtained by copolymerization of the monomer (A) and a radical-polymerizable unsaturated monomer excluding the monomer (A).

(D) is a composite emulsion comprising a sulfonium group wherein inorganic particle core are coated by a layer comprising a copolymer of the aforesaid monomer (A) and a radical-polymerizable unsaturated monomer excluding the monomer (A).

The film-forming step (c-2) is a step for forming a film by electrodeposition wherein a metal material is dipped in an aqueous solution comprising at least one of the above compositions (A), (B), (C), (D), and a current is passed between a cathode and an anode with the metal material as cathode.

Embodiment 2

Another film-forming method according to this invention is a method wherein the following steps (a) and (c) are performed on a metal material: (a) degreasing, and (c) which comprises the following steps (c-1) or (c-2).

The film-forming step (c-1) is a step for forming a film by dipping in an aqueous solution comprising at least one of the following compositions (A), (B), (C), (D), or by spraying, spin coating, roll coating or bar coating.

(A) is a monomer having the general structure (I) comprising a sulfonium group at one end of the molecule, and an active ester group in the same molecule.

(B) is a water-soluble polymer obtained by homopolymerization or copolymerization of the monomer (A).

(C) is an emulsion or water-soluble polymer comprising an active ester group and a sulfonium group obtained by copolymerization of the monomer (A) and a radical-polymerizable unsaturated monomer excluding the monomer (A).

(D) is a composite emulsion comprising an active ester group and a sulfonium group wherein inorganic particle core are coated by a layer comprising a copolymer of the aforesaid monomer (A) and a radical-polymerizable unsaturated monomer excluding the monomer (A).

The film-forming step (c-2) is a step for forming a film by electrodeposition wherein a metal material is dipped in an aqueous solution comprising at least one of the above compositions (A), (B), (C), (D), and a current is passed between a cathode and an anode with the metal material as cathode.

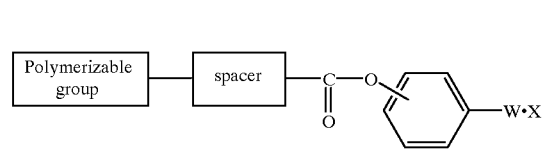

(I)

(in the formula, W is a sulfonium group and X is the counter anion $X_2$ shown above)

Embodiment 3

Another film-forming method according to this invention is a method wherein the following steps (a) and (c) are performed on a metal material: (a) degreasing, and (c) which comprises the following steps (c-1) or (c-2).

The film-forming step (c-1) is a step for forming a film by dipping in an aqueous solution comprising at least one of the following compositions (A), (B), (C), (D) or by spraying, spin coating, roll coating or bar coating.

(A) is a monomer comprising a sulfonium group at one end of the molecule, having a structure shown by the following general formulae (II-1), (II-2), (II-3), (III-1), (III-2), (III-3) or (III-4).

(B) is a water-soluble polymer obtained by homopolymerization or copolymerization of the monomer (A).

(C) is an emulsion or water-soluble polymer comprising a sulfonium group obtained by copolymerization of the monomer (A) and a radical-polymerizable unsaturated monomer excluding the monomer (A).

(D) is a composite emulsion comprising a sulfonium group wherein inorganic particle core are coated by a layer comprising a copolymer of the aforesaid monomer (A) and a radical-polymerizable unsaturated monomer excluding the monomer (A).

The film-forming step (c-2) is a step for forming a film by electrodeposition wherein a metal material is dipped in an aqueous solution comprising at least one of the above compositions (A), (B), (C), (D), and a current is passed between a cathode and an anode with the metal material as cathode.

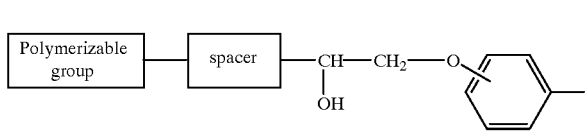

(II-1)

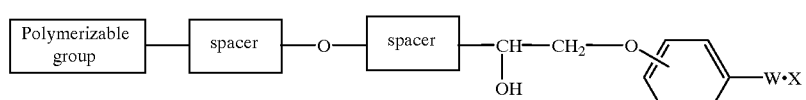

(II-2)

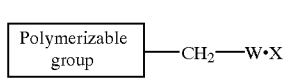

(II-3)

(in the formula, W is a sulfonium group and X is the counter anion $X_1$ or $X_2$ shown above).

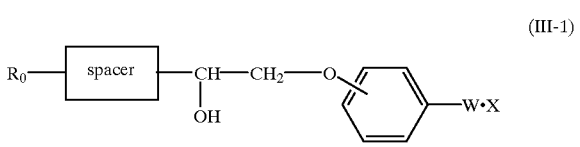

(III-1)

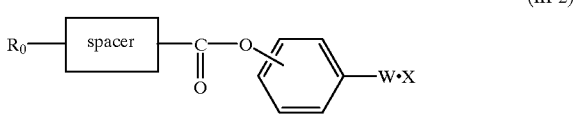

(III-2)

(III-3)

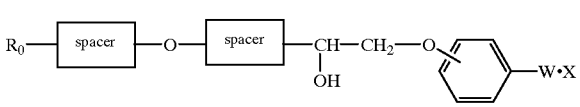

(III-4)

(in the formula, W is a sulfonium group, $R_0$ is methyl or hydroxyl and X is the counter anion $X_1$ or $X_2$ shown above).

(a) Degreasing step

This refers to the removal of grease adhering to the metal surface using alkali or acid.

(b-1) Pre-treatment step

This is the removal of metal oxides on the metal surface using inorganic acids, oxycarboxylic acid compounds or ascorbic acid compounds.

Dipping Method

In the dipping method, a predetermined concentration of one of the following inorganic acids, oxycarboxylic acid compounds or ascorbic acid compounds is dissolved in one of the solvents shown below, and the metal material is dipped in this solution for a predetermined time.

The inorganic acid, oxycarboxylic acid compound or ascorbic acid compound is preferably perchloric acid, hydrochloric acid, sulfuric acid, nitric acid, phosphoric acid or phosphonic acid, tartaric acid, malic acid, citric acid, lactic acid, gluconic acid or ascorbic acid, or an ammonium salt of any of these.

The solvent may for example be water, ethanol, methanol, isopropyl alcohol (IPA), acetone, methylethylketone, benzene, toluene, xylene, tetrahydrofuran, dioxane, diethyl ether, chloroform, or methylene chloride, and is preferably water, ethanol, methanol or isopropyl alcohol (IPA).

The concentration of the aforesaid inorganic acid, oxycarboxylic acid compound or ascorbic acid compound in the dipping solution is 0.1 to 10 weight %, and preferably 1 to 5 weight %. When the concentration of the aforesaid inorganic acid, oxycarboxylic acid compound or ascorbic acid compound is less than 0.1 weight %, the removal of metal oxides from the metal surface is incomplete. On the other hand, if the concentration of the compound exceeds 10 weight %, it is uneconomical.

The pH of the dipping solution is 2 to 12, and preferably 6 to 10. When the pH of the dipping solution is less than 2, the metal material corrodes, and when the pH exceeds 12, removal of metal oxide for the metal surface is incomplete.

The treatment temperature is 0 to 100° C., and preferably 40 to 70° C. When the treatment temperature is less than 0° C. the dipping solution freezes so that treatment is impossible. On the other hand, when the treatment temperature exceeds 100° C., treatment is difficult.

The dipping time of the metal material in the dipping solution is preferably 0.1 seconds to 180 seconds, and more preferably 60 seconds to 120 seconds. When the dipping time is less than 0.1 seconds, removal of metal oxides from the metal surface is incomplete. On the other hand, even when the dipping time exceeds 180 seconds, there is no further improvement and the treatment time is merely prolonged.

(c) Film-forming step

The film-forming step may be either the step (c-1) described in FIG. 1 to FIG. 4 and hereafter, or the step (c-2).

Film-forming step (c-1):

The film-forming step (c-1) is an dipping in an aqueous solution comprising at least one of the following compositions (A), (B), (C) and (D), or the forming of a film by dipping in this aqueous solution by spraying, spin coating, roll coating, or bar coating.

SM treatment solution:

The forming of a film by dipping in an aqueous solution of the monomer (A) of the above Embodiments 1 to 3 (referred to hereafter as "SM treatment solution") is shown in FIG. 1.

The monomer (A) (SM) preferably has one of the structural formulae shown in Group A, Group B, Group C or Group D below.

(Group A)

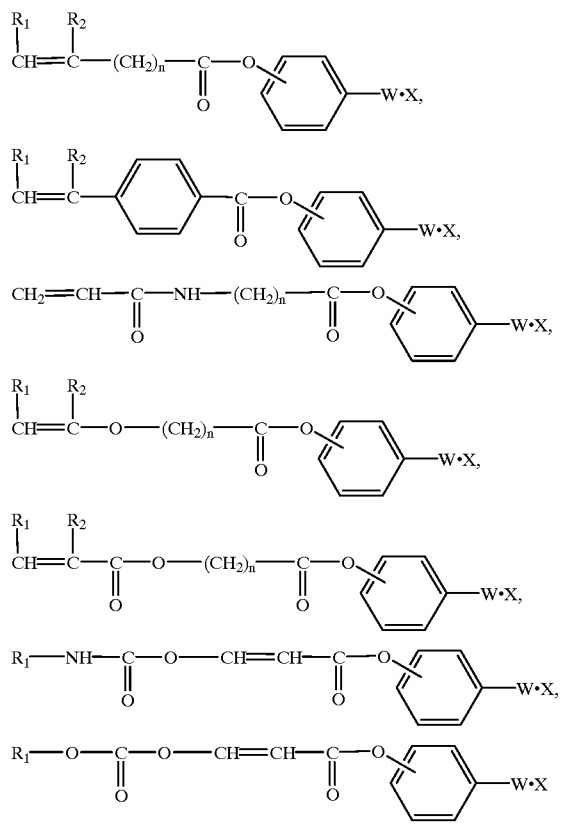

$R_1$, $R_2$ are hydrogen, phenyl, hydroxyl or $C_1$–$C_4$ alkyl and may be identical or different.

n=1 to 17

(in the formula, W is a sulfonium group having the formula below, and X is a counter anion. In Embodiments 1 or 3 this corresponds to the formula for $X_1$, and in Embodiment 2 this corresponds to the formula for $X_2$ shown above).

(Group B)

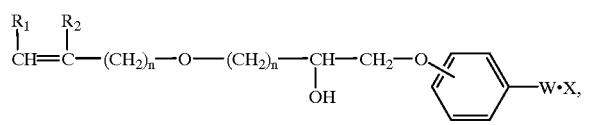

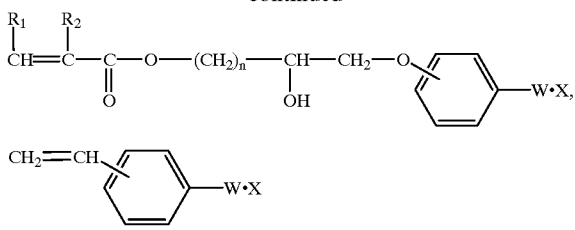

$R_1$, $R_2$ are hydrogen, phenyl, hydroxyl or $C_1$–$C_4$ alkyl and may be identical or different.

n=0 to 17

(in the formula, W is a sulfonium group having the formula below, and X is a counter anion. In Embodiments 1 or 3 this corresponds to the formula $X_1$, and in Embodiment 2 this corresponds to the formula $X_2$ shown above).

(Group C)

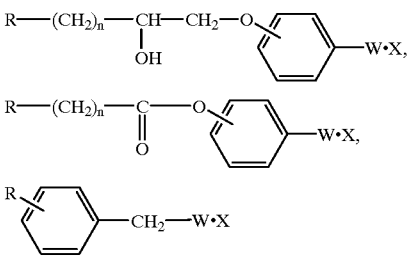

$R_1$, $R_2$ are hydrogen, phenyl, hydroxyl or $C_1$–$C_4$ alkyl and may be identical or different.

n=0 to 17

(in the formula, W is a sulfonium group having the formula below, and X is a counter anion. In Embodiments 1 or 3 this corresponds to the-formula $X_1$, and in Embodiment 2 this corresponds to the formula $X_2$shown above).

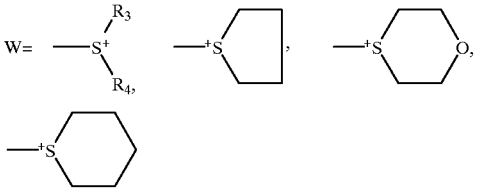

$R_3$, $R_4$ are phenyl, hydroxyl or $C_1$–$C_4$ alkyl and may be identical or different.

(Group D)

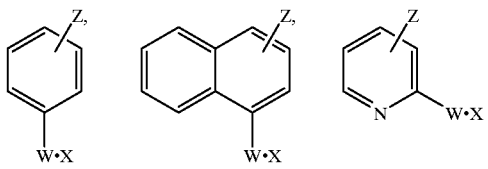

Z=OH, COOH, $NH_2$

W=sulfonium group

The monomer (A) in Embodiment 2 comprising a sulfonium group at one end of the molecule and an active ester group in the same molecule is at least one of the monomers having the following general formula (I).

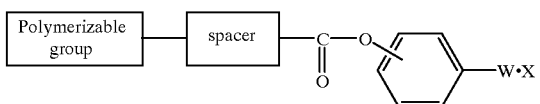

(I)

(in the formula, W is a sulfonium group and X is the counter anion $X_2$ shown above).

The aforesaid spacer and polymerizable group in the above Embodiments 2 and 3 have the general structure shown below.

Polymerizable group:

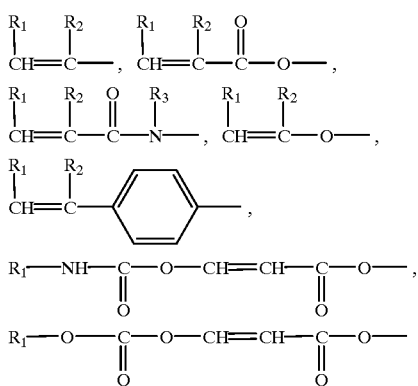

$R_1$, $R_2$, $R_3$ are hydrogen, phenyl, hydroxyl or $C_1$–$C_4$ alkyl and may be identical or different.

Spacer:

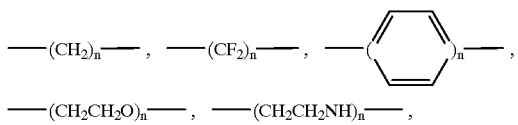

n=an integer from 0 to 18.

The SM concentration in the SM treatment solution is preferably 0.01–10 weight %, but more preferably 0.1–10 weight %. When the SM concentration is less than 0.01 weight %, deposition of the film on the metal surface is difficult, and anticorrosion properties decline. On the other hand, when the SM concentration exceeds 10 weight %, there is no further improvement so the procedure is less economical.

When the molecule comprises an active ester group, the treatment pH of the SM treatment solution during metal treatment is preferably 2–9, but more preferably 3–6. When the pH is less than 2, the SM is hydrolysed, and also when the pH exceeds 9, the SM is hydrolysed. When the molecule does not comprise an active ester group, the treatment pH of the SM treatment solution during metal treatment is preferably 2–12, but more preferably 3–10. When the pH is less than 2, the metal material dissolves. On the other hand when the pH exceeds 12, handling of the treatment solution is difficult.

When the molecule comprises an active ester group, the treatment temperature of the SM treatment solution during metal treatment is preferably 0–40° C., but more preferably 10–20° C. When the temperature is less than 0° C., the SM solution freezes. On the other hand when the temperature exceeds 40° C., the SM is hydrolysed. When the molecule does not comprise an active ester group, the temperature is preferably 0–70° C., but more preferably 10–50° C. When the temperature is less than 0° C., the SM solution freezes. On the other hand, when the temperature exceeds 70° C., there is no further improvement so the procedure is less economical.

The treatment time of the metal material in the SM treatment solution is preferably 1–180 seconds, but more preferably 30–120 seconds. When the treatment time is less than 1 second, the SM does not deposit easily on the metal surface and anti-corrosion properties decrease. On the other hand, when the treatment time exceeds 180 seconds, there is no further improvement and the treatment time is merely prolonged.

Figure 2:
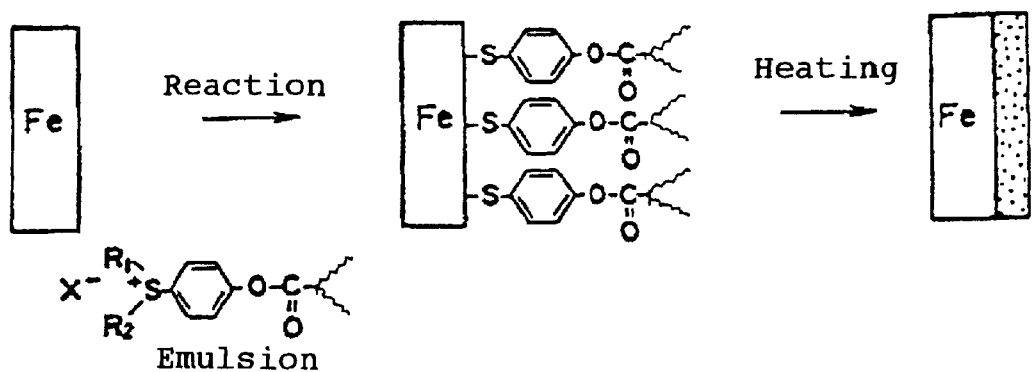
FIG. 2 is a diagram describing a film-forming method using the composition (B) in the film-forming step (c) of Embodiments 1–3, 5 of this invention.

SP treatment solution:

A sulfonium group-containing polymer (referred to hereafter as "SP treatment solution") refers to a homopolymer or one, two or more copolymers of the aforesaid SM (Group A, Group B). The film-forming step is shown in FIG. 2. For SP, a water-soluble monomer having a radical-polymerizable unsaturated bond may be mixed with an aqueous solution of the aforesaid SM. Examples of water-soluble monomers having radical-polymerizable unsaturated bonds are acrylic acid, methacrylic acid, acrylamide, hydroxyethylmethacrylate and vinyl pyrrolidone.

As polymerization initiator, 2,2'-azobis (2-amidinopropane) dihydrochloride (abbreviated hereafter as "AIBA"), 4,4'- azobis (4-cyanovalerianic acid), 2,2'-azobis [2-(5-methyl-2-imidazoline-2-il) propane] dihydrochloride or 2,2'-azobis isobutylamide dihydrate, and persulfates, bisulfites or sulfites are for example preferable. As salts of inorganic polymerization initiators such as persulfates, the alkali metal salt or ammonium salt is preferable.

The concentration of the aforesaid polymerization initiator is 0.1–10 mol %, but preferably 1–5 mol %. When the concentration of polymerization initiator is less than 0.1 mol %, the polymerisability of SP falls. On the other hand when 10 mol % is exceeded, the molecular weight of SP falls.

The treatment concentration, treatment pH, treatment temperature and treatment time are identical to those for SM treatment solution, and will not be described here.

SEm treatment solution:

SEm refers to a copolymer of an SM and one, two or more radical-polymerizable unsaturated monomers excepting SM.

Figure 3:
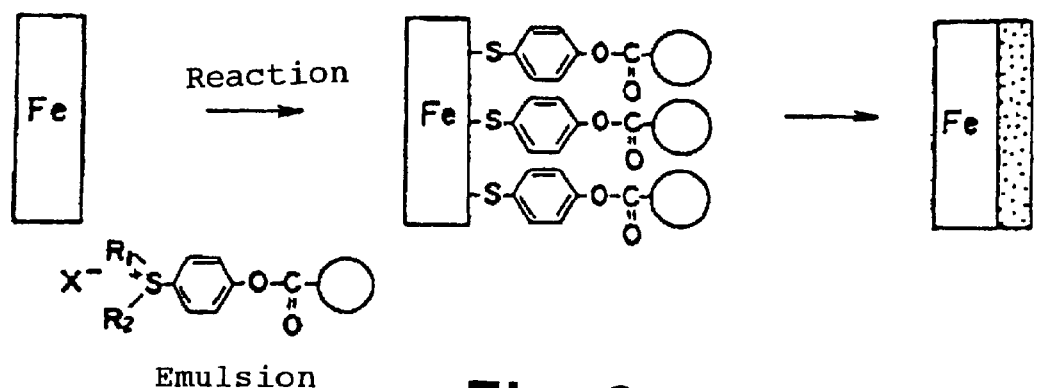
FIG. 3 is a diagram describing a film-forming method using the composition (C) in the film-forming step (c) of Embodiments 1–3, 5 of this invention.

An SEm is a copolymer of an SM with a particularly water-insoluble radical-polymerizable unsaturated monomer, and an aqueous solution of an SEm is an emulsion. The film-forming step is shown in FIG. 3.

Examples of the aforesaid water-insoluble, radical-polymerizable unsaturated monomers are styrene, p-methylstyrene p-chloromethylstyrene, methacrylic acid esters, acrylic acid esters, vinyl acetate and vinyl chloride.

The type and concentration of polymerization initiator are identical to the case of SP, and will not be described here.

The glass transition temperature (Tg) of an SEm is preferably −50° C. to 120° C, but more preferably −25° C. to 100° C. When Tg exceeds 120° C., in a heat treatment step of the next manufacturing step, the melting temperature is high and it is difficult to work.

The SEm concentration of the SEm aqueous solution is preferably 0.1–50 wt %, but more preferably 1–20 wt %. When the SEm concentration is less than 0.1 wt %, the SEm does not deposit easily on the metal surface, therefore anticorrosion properties decline. On the other hand when the SEm concentration exceeds 50 wt %, there is no further improvement so it is uneconomical.

The treatment pH, treatment temperature and treatment time of a metal material in the SEm aqueous solution are identical to the case of the SM (A) hereabove.

SEm composite emulsion:

The composite emulsion (D) is an emulsion (referred to hereafter as "SEm composite emulsion") wherein inorganic particle core are coated with a layer comprising a copolymer of the aforesaid monomer (A) and a radical-polymerizable unsaturated monomer, and it accounts for 0.1–50 wt % of (D). When the SEm concentration is less than 0.1 wt %, the SEm does not easily deposit on the metal surface. Therefore, anticorrosion properties deteriorate. On the other hand when the SEm concentration exceeds 50 wt %, the film tends to become uneven which is not desirable.

The treatment pH, treatment temperature and treated time of the metal material in the SEm aqueous solution are identical to the case of the SM (A).

Figure 4:
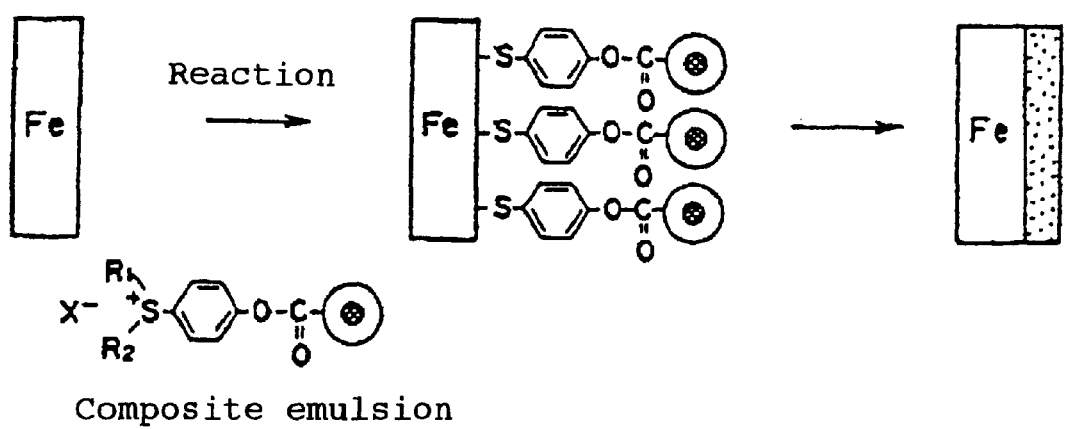
FIG. 4 is a diagram describing a film-forming method using the composition (D) in the film-forming step (c) of Embodiments 1–3, 5 of this invention.

In a film-forming method using (D), a metal is treated in an aqueous solution of an SEm composite emulsion, and a film is formed as shown in FIG. 4.

Also, the radical-polymerizable unsaturated monomer may be identical to that used for the SP (B) hereabove.

Examples of inorganic particles which may function as core of the SEm composite emulsion are silica, alumina, titania, ferrite, titanium phosphate particles, and metal particles of iron and zinc. The particle diameter of these inorganic particles is preferably 0.01–0.5 $\mu$m, but more preferably 0.01–0.3 $\mu$m. When the particle diameter is less than 0.01 $\mu$m, a satisfactory SEm composite emulsion is not obtained. On the other hand when the particle diameter exceeds 0.5 $\mu$m, the film tends to become uneven which is undesirable.

The particle diameter of the SEm composite emulsion is preferably 0.01–1 $\mu$m, but more preferably 0.01–0.5 $\mu$m. When the particle diameter is less than 0.01 $\mu$m, a satisfactory SEm composite emulsion is not obtained. On the other hand when the particle diameter exceeds 1 $\mu$m, film adhesion deteriorates.

The treatment pH, treatment temperature and treatment time of the metal material in the SEm composite emulsion aqueous solution are identical to the case of the SM (A) hereabove. The glass transition temperature (Tg) of the SEm composite emulsion is identical to the glass transition temperature (Tg) of SEm, so it will not be mentioned here.

Film-forming step (c-2)

In the film-forming step (c-2), the metal material is dipped in an aqueous solution comprising at least one of the compositions (A), (B), (C) or (D), and a film is formed by electrodeposition by passing a current between a cathode and an anode with the metal material as cathode. (A), (B), (C) or (D) are the same as above, and their descriptions are therefore omitted.

The dipping bath concentration of the compositions (A) and (B) is preferably 0.01 wt %–15 wt %, but more preferably 0.1 wt %–10 wt %. When the concentration of the above compositions is less than 0.01 wt %, the composition (A) and (B) does not easily deposit on the metal surface. Therefore, the film becomes thin, and anticorrosion properties decline. On the other hand when the concentration of the above composition exceeds 15 wt %, an agglomerate deposits during electrodeposition, and a satisfactory film cannot be formed.

Using (C) and (D), the concentration is preferably 1 wt %–50 wt %, but more preferably 10 wt %–30 wt %. Using (C) or (D), the concentration of the dipping solution is preferably 0.01 wt %–15 wt %, but more preferably 0.1 wt %–10 wt %. When the concentration of either of these compositions is less than 0.01 wt %, (C) or (D) do not deposit easily on the metal surface. Therefore, the film becomes thin, and anticorrosion properties decline. On the other hand when the concentration of a composition of either of the above exceeds 15 wt %, an agglomerate deposits during electrodeposition so that a satisfactory film cannot be formed.

The current density during electrodeposition is preferably 0.1–10 mA/cm$^2$, but more preferably 0.5–5 mA/cm$^2$. When the current density is less than 0.1 mA/cm$^2$, deposition of any of the compositions (A), (B), (C) or (D) on the metal surface is insufficient, and the film becomes thin. On the other hand when the current density exceeds 10 mA/cm$^2$, the amount of deposition of the compositions (A), (B), (C), or (D) on the metal surface increases but no greater anticorrosion effect is obtained so this is uneconomical.

The electrolysis time in electrodeposition is preferably 0.1–180 seconds, but more preferably 30–60 seconds. When the electrolysis time is less than 0.1 seconds, deposition of the composition (A), (B), (C) or (D) on the metal surface is insufficient, the film becomes thin, and anticorrosion properties deteriorate. When the electrolysis time exceeds 180 seconds, deposition of any of the compositions (A), (B), (C) or (D) on the metal surface increases, but there is no further improvement of the anticorrosion effect so this is uneconomical.

In the film-forming method of this invention, a water rinse may be performed after the film-forming step (c) followed by a heat treatment step as necessary. This heat treatment allows a strong organic film comprising the compositions (A), (B) or (C), or organic/inorganic film comprising the composition (D), to be fixed on the metal surface in a short time. It is also desirable that the film thickness is about 0.01–1 $\mu$m.

(d) Heat Treatment Step:

The heat treatment step is any manufacturing step performed to polymerize a monomer or fuse polymers together. The heat treatment temperature is 50° C.–200° C., but preferably 70° C.–170 °C. Heat treatment time is from 10 seconds–20 minutes, but preferably 1–10 minutes.

(e) Finishing step:

A coating of one, or a mixture of two or more of, polyester resin, amino resin, epoxy resin, polyurethane resin or acrylic resin may be applied over the film of this Embodiment. The coating type may be an organic solvent type, powder-type, an emulsion (aqueous or non-aqueous), or an aqueous resin. The coating method may be any coating method known in the art, e.g. electrocoating or spray coating.

Embodiment 4

Another film formation method according to this invention is a film-forming method wherein the following steps (a)–(c) are successively applied to a metal material:

(a) degreasing, (b-2) pre-treatment by an amino type coupling agent and/or mercapto type coupling agent, and (c) the following steps (c-1) or (c-2).

The film-forming step (c-1) is a treatment by an aqueous solution comprising at least one of (A), (C) or (D).

(A) is a monomer comprising a sulfonium group at one end of the molecule, and comprising an active ester group in the same molecule.

(C) is an emulsion having an active ester group obtained by copolymerization of the aforesaid monomer (A) with a radical-polymerizable unsaturated monomer excepting the aforesaid monomer (A).

(D) is a composite emulsion having an active ester group wherein inorganic particle core are coated with a layer comprising a copolymer of the aforesaid monomer (A) and a radical-polymerizable unsaturated monomer excepting the aforesaid monomer (A).

The film-forming step (c-2) is an electrodeposition step wherein a metal material is dipped in an aqueous solution comprising at least one of the above compositions (A), (C) or (D), and the composition is electrolytically polymerized by passing a current between a cathode and an anode with the metal material as cathode.

(a) Degreasing step

This refers to the removal of grease adhering to the metal surface using alkali or acid.

(b-2) Pre-treatment step

This is a step to fix an amino group and/or mercapto group p(known also as —SH group or thiol group) on the metal material surface using an amino type coupling agent and/or mercapto type coupling agent. There are two ways of fixing the aforesaid coupling agent on the metal surface, i. e. the contact method and the electropolymerization method.

(Contact method:)

In the contact method, a predetermined concentration of the following coupling agents is dissolved in the solvents shown below, and the metal material is dipped in the solution for a predetermined time, or the solution is applied by spraying, spin coating, roll coating or a bar coater.

Preferred examples of the aforesaid coupling agent are amino type coupling agents such as 3-aminopropyltrimethoxysilane ("S360", CHISSO Co.), 3-aminopropyltriethoxysilane ("S330", CHISSO Co.), N-(2-aminoethyl)-3- aminopropyltrimethoxysilane ("S320", CHISSO Co.), N-(2-aminoethyl)-3- aminopropylmethyldimethoxysilane "S310", CHISSO Co.), N-(trimethoxysilylpropyl)ethylenediamine ("SH6020", Toray-Dow Co.), 3-ureidopropyltriethoxysilane ("UPS-E", CHISSO Co.), and isopropyltri(N-aminoethyl-aminoethyl)titanate ("Prenact KR44", AJINOMOTO Co.); mercapto type coupling agents such as 3-mercaptopropyltrimethoxysilane ("SH6062", Toray Dow Co.), 3-mercaptopropylmethyldimethoxysilane ("SH6061", Toray-Dow Co.), 2,4,6-trimercapto-S-triazine monosodium salt ("Santhiol N-1", Sankyo Kasei Co.), and 2,4,6-trimercapto-S-triazinetrisodium salt ("Santhiol N-W", Sankyo Kasei Co.).

The solvent may for example be water, ethanol, methanol, isopropyl alcohol (IPA), acetone, methylethylketone, benzene, toluene, xylene, tetrahydrofuran, dioxane, diethyl ether, chloroform or methylene chloride, but is preferably water, ethanol, methanol or isopropyl alcohol (IPA).

The concentration of the aforesaid coupling agent in the dipping fluid is preferably 0.1–10 wt %, but more preferably 0.5–3 wt %. When the concentration of the aforesaid coupling agent is less than 0.1 weight %, the fixing of the coupling agent on the metal surface is insufficient, and the compositions (A), (C) or (D) do not deposit easily on the metal surface. Therefore, anticorrosion properties deteriorate. On the other hand, if the concentration of the coupling agent exceeds 10 weight %, condensation reactions of the dipping solution occur easily, and storage stability decreases.

The dipping time of the metal material in the dipping solution is preferably 0.1 seconds–10 minutes, but more preferably 1 second–5 minutes. When the dipping time is less than 0.1 seconds, the aforesaid compositions (A), (C) or (D) do not deposit easily on the metal surface, therefore the film becomes thin, and anticorrosion properties deteriorate. On the other hand, even if the treatment time exceeds 10 minutes, there is no further improvement of the film and the treatment time is merely prolonged.

(Electropolymerization method)

Electropolymerization is a method wherein a coupling agent and a supporting electrolyte are dissolved in a solvent, and the coupling agent is electrolytically polymerized and fixed on the metal surface by passing a current between a cathode and an anode with the metal material as cathode.

The aforesaid coupling agents are use.

The aforesaid solvent is preferably water. As supporting electrolyte, sodium carbonate and ammonium perchlorate are preferable.

The concentration of the coupling agent in the electrolyte solution is preferably 0.1 mM–100 mM, but more preferably 5 mM–50 mM. When the concentration of the coupling agent is less than 0.1 mM, the compositions (A), (C) or (D) do not deposit easily on the metal surface, therefore the film becomes thin, and anticorrosion properties deteriorate. On the other hand when the concentration of the coupling agent exceeds 100 mM, an agglomerate deposits during electropolymerization, and this interferes with the subsequent film-forming step (c).

The current density during electropolymerization is preferably 2.5–30 mA/cm$^2$, but more preferably 10–20 mA/cm$^2$. When the current density is less than 2.5 mA/cm$^2$, the fixing of the coupling agent on the metal surface is insufficient, and the compositions (A), (C) or (D) do not deposit easily on the metal surface. Therefore, the film becomes thin, and anticorrosion properties deteriorate. When the current density exceeds 30 mA/cm$^2$, the amount of deposition of the compositions (A), (C) or (D) on the metal surface increases, but no greater anticorrosion effect is obtained and this is therefore uneconomical.

The electrolysis time of electropolymerization is preferably 10 seconds–5minutes, but more preferably 30–60 seconds. When the electrolysis time is less than 10 seconds, the fixing of the coupling agent on the metal surface is insufficient, and the compositions (A), (C) or (D) do not deposit easily on the metal surface. Therefore, the film becomes thin, and anticorrosion properties deteriorate. When the electrolysis time exceeds 5 minutes., even if the fixing amount of the coupling agent on the metal surface increases and a film is formed of a composition comprising the aforesaid (A), (C), or (D) in the subsequent film-forming step (c), the adhesion of the film to the metal surface declines.

(c) Film-forming step

Figure 5:
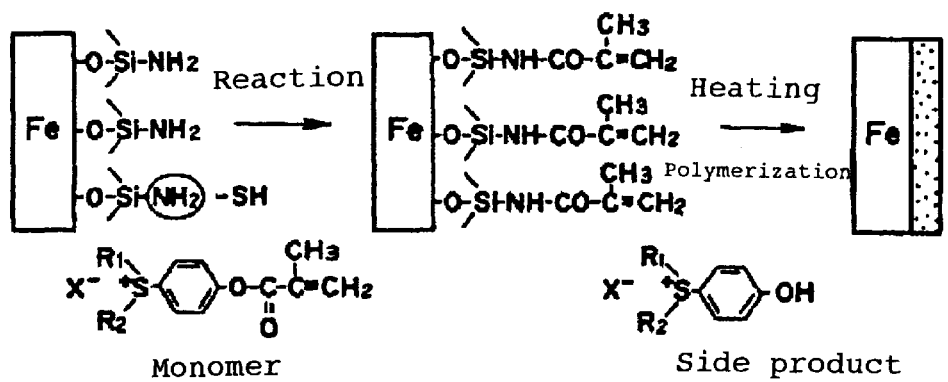
FIG. 5 is a diagram describing a film-forming method using the composition (A) in a film-forming step (c) of Embodiment 4 of this invention.

The film-forming step is described in FIG. 5–FIG. 7, and corresponds to either of the following steps (c-1) or (c-2) mentioned below.

Film-forming step (c-1)

In the film-forming step (c-1), a film is formed by bringing a metal material in contact with an aqueous solution comprising at least one of the compositions (A), (C) or (D) shown below.

AEM treatment solution:

The monomer (A) is a monomer comprising a sulfonium group at one end of the molecule and an active ester group in the same molecule (referred to hereafter as "AEM" which is an abbreviation of active ester monomer). A step for forming a film by bringing a metal material in contact with the aqueous solution of an AEM is shown in FIG. 5.

It is preferable that the monomer (A) comprising a sulfonium group at one end of the molecule and an active ester group in the same molecule (AEM) has the following general formula (I).

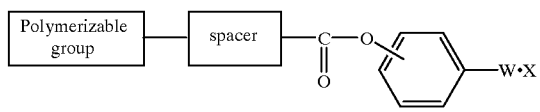
(I)

(in the formula, a combination of a polymerizable group and spacer is shown below, and W and X are as follows.)
Polymerizable group:

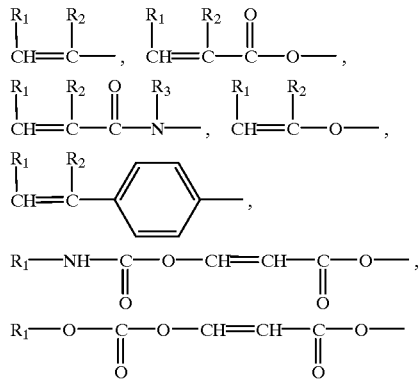

$R_1$, $R_2$, $R_3$ are hydrogen, phenyl, hydroxyl or $C_1$–$C_4$ alkyl and may be identical or different.
Spacer:

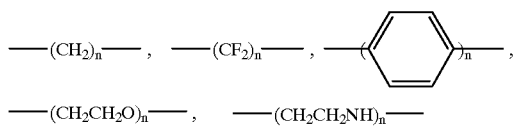

where n=an integer from 0 to 18
W=sulfonium group
W;

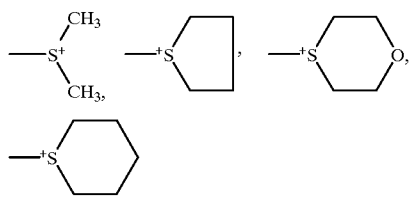

X=counter anion
X=$X_1$; $HSO_4^-$, $CH_3SO_4^-$, $H_2PO_4^-$, $HCO_3^-$, $CH_3COO^-$, $HClO_4^-$, $Br^-$, $Cl^-$, $WoO_4^{2-}$, $MoO_4^{2-}$, $I^-$, $VO^{3-}$,

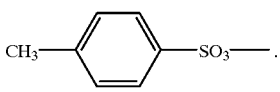

In this Embodiment, the active ester group refers to an ester group adjacent to benzene in the aforesaid structural formula.

Further, the monomer (A) which comprises a sulfonium group at one end of the molecule, and comprising an active ester group in the same molecule (AEM), is a monomer having the following structure.

(Group A)

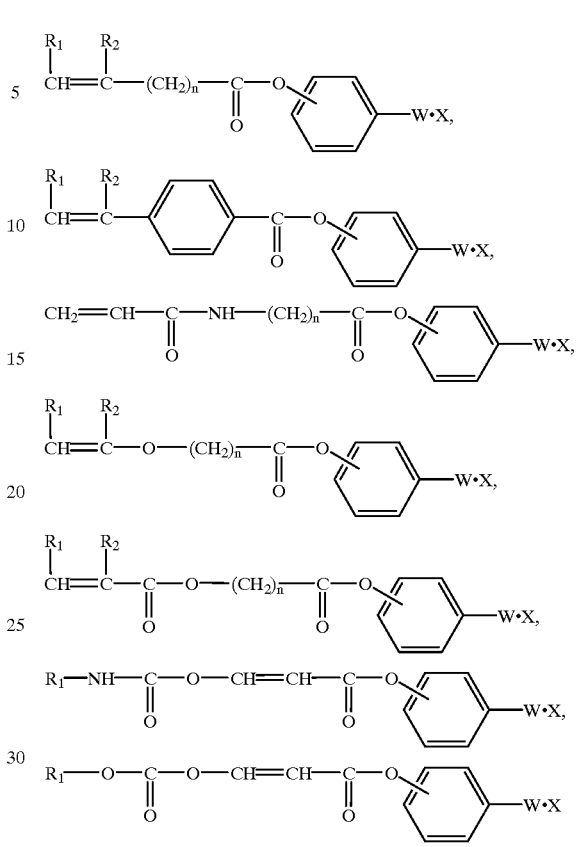

$R_1$, $R_2$ are hydrogen, phenyl, hydroxyl or $C_1$–$C_4$ alkyl and may be identical or different.
where n=1 to 17
W=sulfonium group
W;

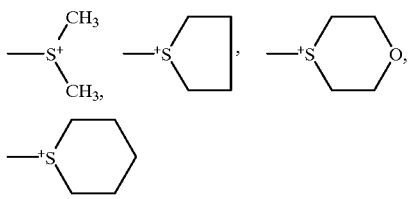

X=counter anion
X=$X_1$; $HSO_4^-$, $CH_3SO_4^-$, $H_2PO_4^-$, $HCO_3^-$, $CH_3COO^-$, $HClO_4^-$, $Br^-$, $Cl^-$, $WoO_4^{2-}$, $MoO_4^{2-}$, $I^-$, $VO^{3-}$,

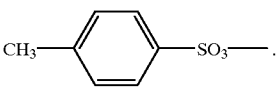

Of the aforesaid sulfonium groups, the sulfonium group W is preferably —S—$(CH_3)_2$. The counter anion X1 is most preferably $HSO_4^-$, $CH_3SO_4^-$, $H_2PO_4^-$, more preferably $Br^-$ or $Cl^-$, and preferably $HCO_3^-$, $CH_3COO^-$, $HClO_4^-$ or p-toluenesulfonate ion.

One, two or more types of AEM may be used, and the aqueous solution of AEM may be mixed with a water-soluble monomer having a radical-polymerizable unsaturated bond. Examples of water-soluble monomers having a radical-polymerizable unsaturated bond are acrylic acid (AA), methacrylic acid, acrylamide, hydroxyethylmethacrlyate and N-vinyl pyrrolidone.

The AEM concentration in the AEM aqueous solution is preferably 0.01–15 wt %, but more preferably 0.1–10 wt %. When the AEM concentration is less than 0.01 wt %, the film does not deposit easily on the metal surface, therefore anticorrosion properties deteriorate. On the other hand when the AEM concentration exceeds 15 wt %, the film tends to be uneven which is undesirable.

The treatment pH of the AEM aqueous solution during metal material treatment is preferably 2–9, but more preferably 3–6. When the treatment pH is less than 2, the AEM is hydrolysed, and when the treatment pH exceeds 9, the AEM is also hydrolysed.

The treatment temperature of the AEM aqueous solution during metal material treatment is preferably 0–40° C., but more preferably 10–20° C. When the treatment temperature is less than 0° C., the AEM aqueous solution freezes. On the other hand when the treatment temperature exceeds 40° C., the AEM is hydrolysed. The treatment time of the metal material in the AEM aqueous solution is preferably 0.1–60 seconds, but more preferably 1–15 seconds. When treatment time is less than 0.1 seconds, the AEM does not deposit easily on the metal surface, and anticorrosion properties therefore deteriorate. On the other hand even if treatment time exceeds 60 seconds, no greater advantage is obtained and the treatment time is merely prolonged.

Figure 6:
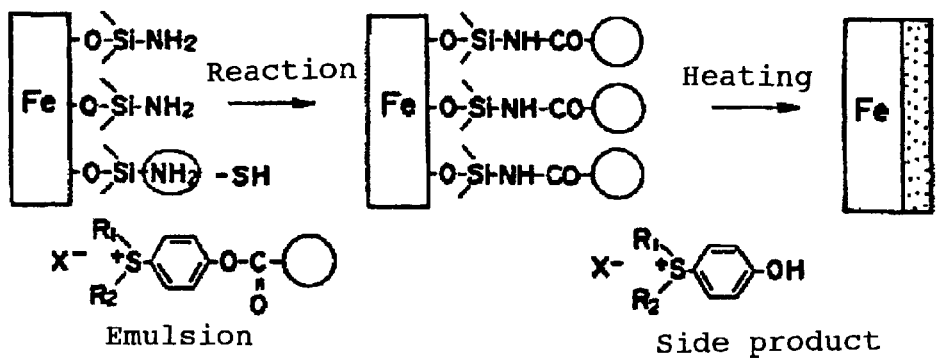
FIG. 6 is a diagram describing a film-forming method using the composition (B) in the film-forming step (c) of Embodiment 4 of this invention.
Figure 7:
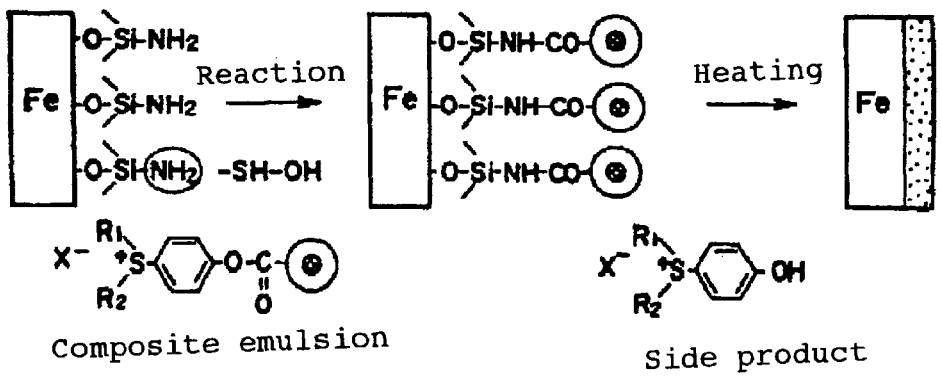
FIG. 7 is a diagram describing a film-forming method using the composition (C) in the film-forming step (c) of Embodiment 4 of this invention.

AEP treatment solution:

A step for forming a film by treatment with an aqueous solution of the emulsion (C) comprising an active ester group (referred to hereafter as an AEP which is an abbreviation of active ester polymer), obtained by copolymerization of the monomer (A) (i.e. AEM) and a radical-polymerizable unsaturated monomer excepting the aforesaid monomer (A), is shown in FIG. 6.

An AEP is a copolymer of an AEM with a particularly water-insoluble radical-polymerizable unsaturated monomer, and an aqueous solution of an AEP is an emulsion.

Examples of the aforesaid water-insoluble, radical-polymerizable unsaturated monomers are styrene, p-methylstyrene, p-chloromethylstyrene, methacrylic acid esters, acrylic acid esters, vinyl acetate and vinyl chloride. Two or more of these water-insoluble, radical-polymerizable unsaturated monomers may be copolymerized with an AEM.

The glass transition temperature (Tg) of an AEP is preferably −50° C. to 120° C., but more preferably −25° C. to 100° C. When Tg exceeds 120° C., in a heat treatment step of the next manufacturing step, the melting temperature is high and it is difficult to work.

The AEP concentration of the AEP aqueous solution is preferably 1–50 wt %, but more preferably 10–30 wt %. When the AEP concentration is less than 1 wt %, AEP does not deposit easily on the metal surface, therefore anticorrosion properties decline. On the other hand when the AEP concentration exceeds 50 wt %, the film tends to be uneven which is undesirable.

The treatment pH, treatment temperature and treatment time of a metal material in the AEP aqueous solution are identical to the case of the AEM (A) hereabove.

AEP composite emulsion:

The composite emulsion (D) is an emulsion (referred to hereafter as "AEP composite emulsion") having an active ester group wherein inorganic particle core are coated with a layer comprising a copolymer of the aforesaid monomer (A) and a radical-polymerizable unsaturated monomer excepting the aforesaid monomer (A). In a film-forming method using (D), a metal is treated in an aqueous solution of AEP composite emulsion, and a film is formed as shown in FIG. 3. Also, the radical-polymerizable unsaturated monomer may be identical to the case of the AEP (C) hereabove.

Examples of inorganic particles which may function as core of the AEP composite emulsion are silica, alumina, titania, ferrite, titanium phosphate particles, and metal particles of iron and zinc. The particle diameter of the AEP composite emulsion is preferably 0.01–1 μm, but more preferably 0.01–0.5 μm. When the particle diameter is less than 0.01 μm, a satisfactory AEP composite emulsion is not obtained. On the other hand when the particle diameter exceeds 1 μm, the film tends to become uneven which is undesirable.

The concentration of AEP composite emulsion in the AEP composite emulsion aqueous solution in the method of forming a film according to (D) is preferably 1–50 wt %, but more preferably 10–30 wt %. When the AEP composite emulsion concentration is less than 1 wt %, the AEP composite emulsion does not easily deposit on the metal surface. Therefore, anticorrosion properties deteriorate. On the other hand when the AEP composite emulsion concentration exceeds 50 wt %, the film tends to become uneven which is undesirable.

The treatment pH, treatment temperature and treatment time of the metal material in the AEP composite emulsion aqueous solution are identical to the case of the AEM (A) hereabove. The glass transition temperature (Tg) of AEP composite emulsion is identical to the glass transition temperature (Tg) of AEP, so it will not be mentioned here.

Film-forming step (c-2)

In the film-forming step (c-2), the metal material is dipped in an aqueous solution comprising at least one of the compositions (A), (C) or (D), and a film is formed by electrodeposition by passing a current between a cathode and an anode with the metal material as cathode. (A), (C) or (D) are the same as described hereabove, and their descriptions will not be repeated.

The dipping bath concentration of the composition (A) is preferably 0.01 wt %–15 wt %, but more preferably 0.1 wt %–10 wt %. When the concentration of the above compositions is less than 0.01 wt %, the composition (A) does not easily deposit on the metal surface. Therefore, the film becomes thin, and anticorrosion properties decline. On the other hand when the concentration of the above composition exceeds 15 wt %, an agglomerate deposits during electrodeposition, and a satisfactory film cannot be formed.

Using (C) or (D), the concentration is preferably 1 wt %–50 wt %, but more preferably 10 wt %–30 wt %. When the concentration of either of these compositions is less than 1 wt %, (C) or (D) do not deposit easily on the metal surface. Therefore, the film becomes thin, and anticorrosion properties decline. On the other hand when the concentration of a composition of either of the above exceeds 50 wt %, an agglomerate deposits during electrodeposition so that a satisfactory film cannot be formed.

The voltage during electropolymerization is preferably 0.1–300 V, but more preferably 5–50 V. When the voltage is less than 0.1 V, deposition of any of the compositions (A), (C) or (D) on the metal surface is incomplete, the film is thin and anticorrosion properties decline. On the other hand, when the voltage exceeds 300 V, deposition of the compositions (A), (C) or (D) on the metal surface increases, but there is no further improvement of the film so this is uneconomical.

The electrolysis time in electropolymerization is preferably 0.1 seconds–5 minutes, but more preferably 30–60 seconds. When the electrolysis time is less than 0.1 seconds, deposition of the composition (A), (C) or (D) on the metal surface is insufficient, the film becomes thin, and anticorrosion properties decline. When the electrolysis time exceeds 5 minutes, deposition of any of the compositions on the metal surface (A), (C), or (D) increases, but there is no further improvement of the anticorrosion effect so this is uneconomical.

The side products shown in FIGS. 1–3 may be recovered, and the AEM, AEP or AEP emulsion manufactured again for re-use.

In the film-forming method of this invention, a water rinse may be performed after the film-forming step (c) followed by a heat treatment step as necessary. This heat treatment allows a strong organic film comprising the compositions (i.e. a film comprising the compositions (A) and (C)), or organic/inorganic film (i.e. a film comprising the composition (D)), to be fixed on the metal surface in a short time. It is also desirable that the film thickness is about 0.01–1 µm.

(d) Heat Treatment Step:

When a film is formed using an AEM (A), AEM are polymerized together by heat to form a strong organic film on the metal surface. Light (e.g. ultra-violet radiation) may be used instead of heat.

The heat treatment temperature is preferably 70–150° C., but more preferably 90–120° C. When the heat treatment temperature is less than 70° C., the AEM do not polymerize, and anticorrosion properties decline. On the other hand even if the heat treatment temperature exceeds 150° C., there is no difference of polymerization rate, so this is uneconomical.

The heat treatment time is preferably 10 seconds–10 minutes, but more preferably 30 seconds–5 minutes. When the heat treatment time is less than 10 seconds, the AEM do not polymerize, and anticorrosion properties decline. On the other hand even if the heat treatment time exceeds 10 minutes, there is no difference of polymerization rate, so this is uneconomical.

A water-soluble polymerization initiator may be added in order to increase the polymerization rate of the film. The polymerization initiator may be added in one of the following ways.

(i) The AEM may be fixed to the metal surface in the film-forming step (c), the metal material to which the AEM are fixed then dipped in an aqueous solution of one of the following polymerization initiators, and heat treatment performed.

(ii) One of the following polymerization initiators may first be added to an AEM aqueous solution in the film-forming step (c), the metal material treated by this AEM aqueous solution containing the polymerization initiator, the metal material withdrawn from the AEM aqueous solution, and heat treatment performed.

The aforesaid polymerization initiator is preferably, for example, 2,2'-azobis (2-amidinopropane) dihydrochloride (abbreviated hereafter as "AIBA"), 4,4'-azobis (4-cyanovalerianic acid), 2,2'- azobis [2-(5-methyl-2-imidazoline-2-il) propane] dihydrochloride, 2,2'-azobis isobutylamide dihydrate, or a persulfate, bisulfite or sulfite. An inorganic polymerization initiator such as a persulfate is preferably an alkali metal salt or an ammonium salt.

When a film is formed using an AEP (C) and an AEP composite emulsion (D), the AEP or AEP composite emulsion is caused to adhere to the metal surface by heat to form a strong organic film (case (C)) or organic/inorganic film (case (D)) on the metal surface.

The heat treatment temperature is preferably not less than the glass transition temperature (Tg) of the AEP (C) or (D) AEP composite emulsion. When it is less than Tg, adhesion is insufficient, and anticorrosion properties slightly decrease.

The heat treatment time is preferably 10 seconds–10 minutes, but more preferably 30 seconds–5 minutes. When the heat treatment time is less than 10 seconds, the AEM do not polymerize and anticorrosion properties decline. On the other hand even if the heat treatment time exceeds 10 minutes, there is no difference of polymerization rate, so this is uneconomical.

A water-soluble crosslinking agent may be added to increase the degree of crosslinking of the film. The crosslinking agent may be added in one of the following ways.

(i) The AEP (C) or AEP composite emulsion (D) may be fixed to the metal surface in the film-forming step (c), the metal material to which the aforesaid composition is fixed then treated in an aqueous solution of one of the following crosslinking agents, and heat treatment performed.

(ii) One of the following crosslinking agents may first be added to a AEP (C) aqueous solution or AEP composite emulsion (D) aqueous solution in the film-forming step (c), the metal material treated by this AEP (C) aqueous solution or (D) AEP composite emulsion aqueous solution containing the crosslinking agent, the metal material withdrawn from the aqueous solution, and heat treatment performed.

Examples of suitable crosslinking agents are water-soluble amines. As water-soluble amines, ethylenediamine, diethylenetriamine, triethylenetetramine and 2-trisaminoethylamine are for example preferable.

Even if the above heat-treatment step is omitted, after the film-forming step (c), the AEM (A) instantaneously cross-link together to form a strong organic film. The AEP (C) and the AEP emulsion (D) also undergo inter-particle crosslinking to form a strong organic film.

(e) Finishing step

The finishing step is identical to the aforementioned step, and will not be described here.

Embodiment 5

Another film formation method according to this invention is a film-forming method wherein the following steps (a) and (c) are successively applied to a metal material, (a) degreasing, (c) is the following steps (c-1) or (c-2).

The aforesaid film-forming step (c-1) is a treatment with an aqueous solution comprising at least one of (A), (C) or (D).

(A) is a monomer comprising a sulfonium group at one end of the molecule, and comprising an active ester group in the same molecule.

(C) is an emulsion having an active ester group obtained by copolymerization of the aforesaid monomer (A) with a radical-polymerizable unsaturated monomer excepting the aforesaid monomer (A).

(D) is a composite emulsion having an active ester group wherein inorganic particle core are coated with a layer comprising a copolymer of the aforesaid monomer (A) and a radical-polymerizable unsaturated monomer excepting the aforesaid monomer (A).

The aforesaid film-forming step (c-2) is an electrodeposition step wherein a metal material is dipped in an aqueous solution comprising at least one of the above compositions (A), (C) or (D), and the composition is electrolytically polymerized by passing a current between a cathode and an anode with the metal material as cathode.

(a) Degreasing step

This refers to the removal of grease adhering to the metal surface using alkali or acid.

(c) Film-forming step

The film-forming step is described in FIG. 1, FIG. 3 and FIG. 4, and corresponds to either of the following steps (c-1) or (c-2) mentioned below.

Film-forming step (c-1)

In the film-forming step (c-1), a film is formed by dipping a metal material in an aqueous solution comprising at least one of the compositions (A), (C) or (D) shown below or by spraying, spin coating, roll coating, or bar coating, and as it is identical to that of Embodiment 4, it will not be described again here.

Film-forming step (c-2)

In the film-forming step (c-2), the metal material is dipped in an aqueous solution comprising at least one of the compositions (A), (C) or (D), and a film is formed by electropolymerization by passing a current between a cathode and an anode with the metal material as cathode. This step is identical to that of Embodiment 4, and will not be described again here.

(d) Heat-treatment step

This is identical to that of Embodiment 4, and will not be described again here.

(e) Finishing step

The finishing step is identical to that described hereabove, and will not be repeated here.

The aforesaid (a) degreasing step and (b) pre-treatment step in the aforesaid Embodiments are not absolutely essential, and may be performed as necessary.

It should be understood that functional groups in the aforesaid structural formulae can be bonded to the o-, m- or p-position of the aromatic ring.

Moreover, in the film-forming method according to this invention, iron, aluminum, zinc, alloy plated steel plate such as fusion galvanized steel plate, galvanized steel plate and stainless steel may be used as the metal material on which a film is formed.

EXAMPLES

Next, this invention will be described in detail by referring to specific examples and comparative examples, but it should be understood that the invention is in no way limited thereby.

Examples 1–28, Comparative Examples 1–8 and Reference Example 9

(1) Manufacture of Composition used in Film-forming method (c)

Manufacturing Example 1

1 g methacryloxyphenyldimethylsulfonium nitrate shown below (MAPDS . N), 0.019 g AIBA as polymerization initiator and 40 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The polymer obtained will be referred to as SP-A.

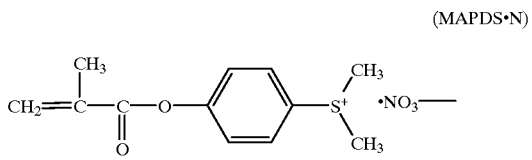

(MAPDS·N)

Manufacturing Example 2

1 g dimethylsulfoniummethylstyrene nitrate shown below (DMSMS . N), 0.022 g AIBA as polymerization initiator and 40 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The polymer obtained will be referred to as SP-B.

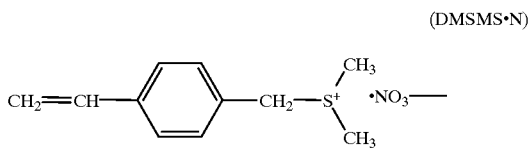

(DMSMS·N)

Manufacturing Example 3

1 g methacrylic-1-hydroxyethyloxyphenyldimethylsulfonium nitrate shown below (GMAPDS . N), 0.017 g AIBA as polymerization initiator and 40 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The polymer obtained will be referred to as SP-C.

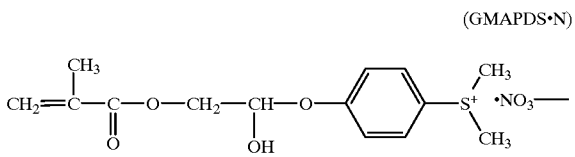

(GMAPDS·N)

Manufacturing Example 4

20.88 g styrene, 11.35 g methyl methacrylate, 9.37 g n-butyl acrylate, 2.28 g MAPDS . N, 0.54 g AIBA as polymerization initiator and 200 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The emulsion obtained will be referred to as SEm-A.

Manufacturing Example 5

20.88 g styrene, 11.35 g methyl methacrylate, 9.37 g n-butyl acrylate, 1.93 g DMSMS . N, 0.54 g AIBA as polymerization initiator and 200 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The emulsion obtained will be referred to as SEm-B.

Manufacturing Example 6

20.88 g styrene, 11.35 g methyl methacrylate, 9.37 g n-butyl acrylate, 2.54 g GMAPDS . N, 0.54 g AIBA as polymerization initiator and 200 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The emulsion obtained will be referred to as SEm-C.

Manufacturing Example 7

50 g water, 0.1 g ferrite-coated magnetic particles and 0.035 g p-10-undecenoyloxyphenyldimethylsulfoniumnitrate (UPDS . N) shown below were introduced into a three-neck flask fitted with a mechanical stirrer, reflux tube and nitrogen inlet tube, ultrasonically dispersed for 1 hour and stirred for 6 hours. 0.018 g dibutyl fumarate and 0.017 g styrene were added, and the resulting mixture stirred at 25° C. for 20 hours.

Next, 0.007 g potassium persulfate (KPS) was added as initiator, and polymerization was carried out at 60° C. for 24 hours in a nitrogen atmosphere at a stirrer speed of 350 rpm. The emulsion obtained will be referred to as SEm-D.

(UPDS·N)

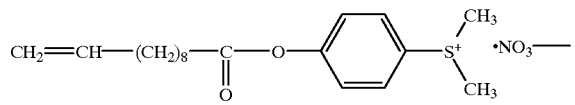

Manufacturing Example 8 (for Comparative Example)

1 g of acrylamide, 0.017 g AIBA as polymerization initiator and 40 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The polymer obtained will be referred to as SP-D.

Manufacturing Example 9 (for Comparative Example)

20.88 g styrene, 11.35 g methyl methacrylate, 9.37 g n-butyl acrylate, 0.54 g AIBA as polymerization initiator and 200 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The emulsion obtained will be referred to as SEm-E.

Manufacturing Example 10 (for Comparative Example)

1 g methacrylic acid, 0.016 g AIBA as polymerization initiator and 40 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C., and polymerization was carried out for 6 hours in a nitrogen atmosphere at a stirrer speed of 350 rpm. The polymer obtained will be referred to as SP-E.

Manufacturing Example 11

1 g methacryoxyphenyldimethylsulfonium oxalate shown below (MAPDS 0), 0.016 g AIBA as polymerization initiator and 40 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was heated to 60° C.,, and polymerization was carried out for 6 hours in a nitrogen atmosphere at a stirrer speed of 350 rpm. The polymer obtained will be referred to as SP-F.

(MAPDS·O)

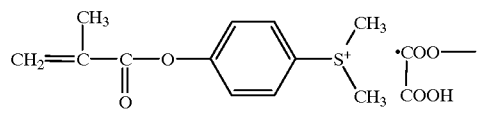

(2) Film-Forming Method of Examples and Comparative Examples

Example 1

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % MAPDS . N (SM-A) for 60 seconds, and rinsed with tap water to form a film. Next, a cationic electrodeposition paint ("POWERTOP V-50", NIPPON PAINT Co., Ltd.) was electrodeposited on the film-treated cold-rolled steel plate and galvanized steel plate, and an anionic electrodeposition paint ("POWERMIGHT 3000", NIPPON PAINT Co., Ltd.) was electrodeposited on the film-treated aluminum plate, to a dry film thickness of 25 μm.

Example 2

A film was formed according to Example 1 except that DMSMS . N (SM-B) was used instead of SM-A, and the film was electrocoated according to Example 1.

Example 3

A film was formed according to Example 1 except that GMAPDS . N (SM-C) was used instead of SM-A, and the film was electrocoated according to Example 1.

Example 4

A film was formed according to Example 1 except that electrolysis treatment (1 mA/cm$^2$×60 seconds) was performed, and the film was electrocoated according to Example 1.

Example 5

A film was formed according to Example 1 except that CA treatment was not performed, and the film was electrocoated according to Example 1.

Example 6

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % SP-A for 60 seconds, and rinsed with tap water to form a film. Next, a cationic electrodeposition paint ("POWERTOP V-50", NIPPON PAINT Co., Ltd.) was electrodeposited on the film-treated cold-rolled steel plate and galvanized steel plate, and an anionic electrodeposition paint ("POWERMIGHT 3000", NIPPON PAINT Co., Ltd.) was electrodeposited on the film-treated aluminum plate, to a dry film thickness of 25 µm.

Example 7

A film was formed according to Example 6 except that SP-B was used instead of SP-A, and the film was electrocoated according to Example 6.

Example 8

A film was formed according to Example 6 except that SP-C was used instead of SP-A, and the film was electrocoated according to Example 6.

Example 9

A film was formed according to Example 6 except that electrolysis was performed (1 MA/cm$^2$×60 seconds), and the film was electrocoated according to Example 6.

Example 10

A film was formed and electrodeposited according to Example 6 except that CA treatment was not performed, and the film was electrocoated according to Example 6.

Example 11

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % SEm-A for 60 seconds, and rinsed with tap water to form a film. Next, a cationic electrodeposition paint ("POWERTOP V-50", NIPPON PAINT Co., Ltd.) was electrodeposited on the film-treated cold-rolled steel plate and galvanized steel plate film, and an anionic electrodeposition paint ("POWERMIGHT 3000", NIPPON PAINT Co., Ltd.) was electrodeposited on the film-treated aluminum plate, to a dry film thickness of 25 µm.

Example 12

A film was formed according to Example 11 except that SEm-B was used instead of SEm-A, and the film was electrocoated according to Example 11.

Example 13

A film was formed according to Example 11 except that SEm-C was used instead of SEm-A, and the film was electrocoated according to Example 11.

Example 14

A film was formed according to Example 11 except that electrolysis was performed (1 mA/cm$^2$×60 seconds), and the film was electrocoated according to Example 11.

Example 15

A film was formed according to Example 11 except that CA treatment was not performed, and the film was electrocoated according to Example 11.

Example 16

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % SEm-A for 60 seconds, and rinsed with tap water to form a film. Next, an aqueous paint ("O-DESHINE KS Black SA-1", NIPPON PAINT Co., Ltd.) was spray-coated on the film-treated plate to a dry film thickness of 25 µm.

Example 17

A film was formed according to Example 16 except that SEm-B was used instead of SEm-A, and the film was spray-coated according to Example 16.

Example 18

A film was formed according to Example 16 except that SEm-C was used instead of SEm-A, and the film was spray-coated according to Example 16.

Example 19

A film was formed and electrodeposited according to Example 16 except that electrolysis was performed (1 mA/cm$^2$×60 seconds), and the film was spray-coated according to Example 16.

Example 20

A film was formed and electrodeposited according to Example 16 except that CA treatment was not performed, and the film was spray-coated according to Example 16.

Example 21

A film was formed and electrodeposited according to Example 6 except that ammonium ascorbate (AB) was used instead of the CA of Example 6, and the film was electrocoated according to Example 6.

Example 22

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % MAPDS . O (SM-D) for 60 seconds, and rinsed with tap water to form a film. Next, a cationic electrodeposition paint ("POWERTOP V-50", NIPPON PAINT Co., Ltd.) was electrodeposited on the film-treated, cold-rolled steel plate and galvanized steel plate, and an anionic electrodeposition paint ("POWERMIGHT 3000", NIPPON PAINT Co., Ltd.) was electrodeposited on the film-treated aluminum plate, to a dry film thickness of 25 µm.

Example 23

A film was formed according to Example 22 except that SP-F was used instead of SM-D, and the film was electrocoated according to Example 22.

Example 24

A film was formed according to Example 22 except that 2-hydroxynaphthyldimethylsulfonium phosphate (SM-E)

was used instead of SM-D, and the film was electrocoated according to Example 22.

Example 25

A film was formed according to Example 22 except that 2-aminophenyldimethylsulfonium phosphate (SM-F) was used instead of SM-D, and the film was electrocoated according to Example 22.

Example 26

A film was formed according to Example 22 except that 2-carboxyphenyldimethylsulfonium phosphate (SM-G) was used instead of SM-D, Example 27

A film was formed according to Example 22 except that 3-carboxy-2-dimethylsulfoniumpyridine phosphate (SM-H) was used instead of SM-D in Example 22, and the film was electrocoated according to Example 22.

Example 28

A film was formed according to Example 22 except that 3-minophenyldimethylsulfonium phosphate (SM-i) was used instead of SM-D in Example 22, and the film was electrocoated according to Example 22.

Comparative Example 1

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % SP-D for 60 seconds, and rinsed with tap water to form a film. Next, a cationic electrodeposition coating ("POWERTOP V-50", NIPPON PAINT Co., Ltd.) was electrodeposited on the film-treated cold-rolled steel plate and galvanized steel plate, and an anionic electrodeposition coating ("POWERMIGHT 3000", NIPPON PAINT Co., Ltd.) was electrodeposited on the film-treated aluminum plate, to a dry film thickness of 25 µm.

Comparative Example 2

A film was formed according to Comparative Example 1 except that SP-E was used instead of SP-D without performing CA treatment, and the film was electrocoated according to Comparative Example 1.

Comparative Example 3

A film was formed according to Comparative Example 1 except that electrolysis was performed (1 mA/cm$^2$×60 seconds), and the film was electrocoated according to Comparative Example 1.

Comparative Example 4

A film was formed according to Comparative Example 1 except that CA- treatment was not performed, and the film was electrocoated according to Comparative Example 1.

Comparative Example 5

A degreased, rinsed cold-rolled steel plate, galvanized steel plate and aluminum plate (Nippon Test Panels) were dipped in 3 wt % ammonium citrate (CA) at 60° C. for 2 minutes, rinsed with tap water and ion exchange water, dipped in 1 wt % SEm-E for 60 seconds, and rinsed with tap water to form a film. Next, a cationic electrodeposition coating ("POWERTOP V-50", NIPPON PAINT Co., Ltd.) was electrodeposited on the film-treated cold-rolled steel plate and galvanized steel plate, and an anionic electrodeposition coating ("POWERMIGHT 3000", NIPPON PAINT Co., Ltd.) was electrodeposited on the film-treated aluminum plate, to a dry film thickness of 25 µm.

Comparative Example 6

A film was formed according to Comparative Example 5 except that electrolysis was performed (1 mA/cm$^2$×60 seconds), and the film was electrocoated according to Comparative Example 5.

Comparative Example 7

A film was formed according to Comparative Example 5 except that CA treatment was not performed, and the film was electrocoated according to Comparative Example 5.

Comparative Example 8

A film was formed according to Comparative Example 5 except that CA treatment and SEm-E treatment were not performed, and the film was electrocoated according to Comparative Example 5.

Reference Example 9

A film was formed according to Comparative Example 5 except that CA treatment was not performed, and zinc phosphate treatment was performed instead of SEm-E treatment.

(3) Evaluation Method:

(a) Adhesion test/Cross-cut Adhesion test;

An electrocoated plate was dipped in water at 40° C. for 240 hours, the plate was lifted out and dried in a current of air, 100 pieces of 1 mm squares were drawn on the coating by a cutter, cellophane tape was pressed onto the coating and then the tape was rapidly peeled off The adhesion of the coating was evaluated by examining the coating and counting the number of remaining squares.

(b) Anticorrosion resistance test;

A crosscut was marked on the plate and the plate was dipped in 5% solution of salt at 55° C. for 240 hours. The plate was lifted out and dried in a current of air, cellophane tape was pressed onto the crosscut and then the tape was rapidly peeled off. The peeling width on one side of the crosscut was measured.

The evaluation results of the aforesaid examples, comparative examples and reference example are shown in Tables 1–4.

TABLE 1

| | | | Example | | | | | | | |
|---|---|---|---|---|---|---|---|---|---|---|
| | | | 1 | 2 | 3 | 4 | 5 | 6 | 7 | 8 |
| Type of oxycarboxylic acid in metal plate pretreatment solution | | | CA | CA | CA | CA | — | CA | CA | CA |
| Film-forming Solution | | Sample | SM-A | SM-B | SM-C | SM-A | SM-A | SP-A | SP-B | SP-C |
| | | Film-Forming method | Dipping | Dipping | Dipping | Electrolysis | Dipping | Dipping | Dipping | Dipping |
| Treated Metal plate | Cold-roll Steel Plate | Corrosion Resistance (mm) | 0.6 | 0.5 | 0.5 | 0.4 | 0.7 | 0.5 | 0.4 | 0.5 |
| | | Hot water adhesion (number of remaining) cross-cuts) | 100 | 100 | 100 | 100 | 100 | 100 | 100 | 100 |
| | Galvanized Steel Plate | Corrosion Resistance (mm) | 0.5 | 0.5 | 0.5 | 0.4 | 0.5 | 0.3 | 0.3 | 0.3 |
| | | Hot water adhesion (number of remaining cross-cuts) | 100 | 100 | 100 | 100 | 100 | 100 | 100 | 100 |
| | Aluminum Plate | Corrosion Resistance (mm) | 0.6 | 0.5 | 0.5 | 0.4 | 0.6 | 0.5 | 0.5 | 0.4 |
| | | Hot water adhesion (number of remaining cross-cuts) | 100 | 100 | 100 | 100 | 100 | 100 | 100 | 100 |

| | | | Example | | | | | |
|---|---|---|---|---|---|---|---|---|
| | | | 9 | 10 | 11 | 12 | 13 | 14 |
| Type of oxycarboxylic acid in metal plate pretreatment solution | | | CA | — | CA | CA | CA | CA |
| Film-forming Solution | | Sample | SP-A | SP-A | SEm-A | SEm-B | SEm-C | SEm-A |
| | | Film-Forming method | Electrolysis | Dipping | Dipping | Dipping | Dipping | Electrolysis |
| Treated Metal plate | Cold-roll Steel Plate | Corrosion Resistance (mm) | 0.3 | 0.7 | 0.5 | 0.6 | 0.5 | 0.5 |
| | | Hot water adhesion (number of remaining cross-cuts) | 100 | 100 | 100 | 100 | 100 | 100 |
| | Galvanized Steel Plate | Corrosion Resistance (mm) | 0.3 | 0.6 | 0.5 | 0.5 | 0.5 | 0.5 |
| | | Hot water adhesion (number of remaining cross-cuts) | 100 | 100 | 100 | 100 | 100 | 100 |
| | Aluminum Plate | Corrosion Resistance (mm) | 0.3 | 0.7 | 0.5 | 0.6 | 0.5 | 0.4 |
| | | Hot water adhesion (number of remaining cross-cuts) | 100 | 100 | 100 | 100 | 100 | 100 |

TABLE 2

| | | | Example | | | | | | | | |
|---|---|---|---|---|---|---|---|---|---|---|---|
| | | | 15 | 16 | 17 | 18 | 19 | 20 | 21 | 22 | 23 |
| Type of oxycarboxylic acid in metal plate pretreatment solution | | | — | CA | CA | CA | CA | — | AB | CA | CA |
| Film-forming Solution | | Sample | SEm-D | SEm-A | SEm-B | SEm-C | SEm-A | SEm-D | SP-A | SM-D | SP-F |
| | | Film-forming method | Dipping | Dipping | Dipping | Dipping | Electrolysis | Dipping | Dipping | Dipping | Dipping |
| Treated Metal Plate | Cold-roll Steel Plate | Corrosion Resistance (mm) | 0.6 | 1.1 | 1.1 | 1.2 | 1.1 | 1.4 | 0.5 | 0.5 | 0.6 |
| | | Hot water adhesion (number of remaining cross-cuts) | 100 | 100 | 100 | 100 | 100 | 100 | 100 | 100 | 100 |

TABLE 2-continued

|  |  | Example | | | | | | | | |
|---|---|---|---|---|---|---|---|---|---|---|
|  |  | 15 | 16 | 17 | 18 | 19 | 20 | 21 | 22 | 23 |
| Galvanized Steel Plate | Corrosion Resistance (mm) | 0.5 | 0.9 | 1.1 | 1.0 | 1.0 | 1.2 | 0.3 | 0.5 | 0.6 |
|  | Hot water adhesion (number of remaining cross-cuts) | 100 | 100 | 100 | 100 | 100 | 100 | 100 | 100 | 100 |
| Aluminum Plate | Corrosion Resistance (mm) | 0.5 | 1.2 | 1.1 | 1.2 | 1.1 | 1.3 | 0.5 | 0.6 | 0.6 |
|  | Hot water adhesion (number of remaining cross-cuts) | 100 | 100 | 100 | 100 | 100 | 100 | 100 | 100 | 100 |

TABLE 3

|  |  |  | Example | | | | |
|---|---|---|---|---|---|---|---|
|  |  |  | 24 | 25 | 26 | 27 | 28 |
| Type of oxycarboxylic acid In metal plate pretreatment solution |  |  | — | — | — | — | — |
| Film-forming Solution | Sample Film-forming method |  | SM-E Dipping | SM-F Dipping | SM-G Dipping | SM-H Dipping | SM-i Dipping |
| Treated Metal Plate | Cold-roll Steel Plate | Corrosion Resistance (mm) | 0.5 | 0.5 | 0.4 | 0.4 | 0.8 |
|  |  | Hot water adhesion (number of remaining cross-cuts) | 100 | 100 | 100 | 100 | 100 |
|  | Galvanized Steel Plate | Corrosion Resistance (mm) | 0.4 | 0.6 | 0.5 | 0.4 | 0.9 |
|  |  | Hot water adhesion (number of remaining cross-cuts) | 100 | 100 | 100 | 100 | 100 |
|  | Aluminum Plate | Corrosion Resistance (mm) | 0.3 | 0.5 | 0.5 | 0.5 | 0.7 |
|  |  | Hot water adhesion (number of remaining cross-cuts) | 100 | 100 | 100 | 100 | 100 |

TABLE 4

|  |  |  | Comparative Example | | | | | | | | Reference Example |
|---|---|---|---|---|---|---|---|---|---|---|---|
|  |  |  | 1 | 2 | 3 | 4 | 5 | 6 | 7 | 8 | 9 |
| Type of oxycarboxylic acid In metal plate pretreatment solution |  |  | CA | — | CA | — | CA | CA | — | — | — |
| Film-forming Solution | Sample Film-forming method |  | SP-D Dipping | SP-E Dipping | SP-D Electrolysis | SP-D Dipping | SEm-E Dipping | SEm-E Electrolysis | SEm-E Dipping | — Dipping | Zinc phosphate Dipping |
| Treated Metal Plate | Cold-roll Steel Plate | Corrosion Resistance (mm) | 5 | 3.5 | 6.5 | 20 | 5.5 | 6 | 20 | 20 | 0.5 |
|  |  | Hot water adhesion (number of remaining cross-cuts) | 100 | 100 | 100 | 100 | 100 | 100 | 100 | 100 | 100 |
|  | Galvanized Steel Plate | Corrosion Resistance (mm) | 4.5 | 3 | 4.5 | 12.5 | 5.5 | 5.5 | 20 | 9.5 | 0.5 |

TABLE 4-continued

|  |  | Comparative Example | | | | | | | | Reference Example |
|---|---|---|---|---|---|---|---|---|---|---|
|  |  | 1 | 2 | 3 | 4 | 5 | 6 | 7 | 8 | 9 |
|  | Hot water adhesion (number of remaining cross-cuts) | 100 | 100 | 100 | 100 | 100 | 100 | 100 | 100 | 100 |
| Aluminum Plate | Corrosion Resistance (mm) | 5 | 3.5 | 6.5 | 6.5 | 5 | 6.5 | 20 | 12.5 | 0.5 |
|  | Hot water adhesion (number of remaining cross-cuts) | 100 | 100 | 100 | 100 | 100 | 100 | 100 | 100 | 100 |

Examples 29–54 and Comparative Examples 10–24

(1) (c) Method of Manufacturing Composition used in Film-forming step

Manufacturing Example 12

41.7 g styrene, 3.92 g acrylamide undecanoyl oxyphenyldimethylsulfoniummethylsulfate (AUPDS . M), 0.54 g AIBAas polymerization initiator and 200 g water were added to a three-neck flask fitted with a mechanical stirrer, reflux tube and nitrogen inlet tube, and the atmosphere in the flask was replaced with nitrogen by bubbling for approx. 30 minutes at room temperature. Next, the flask was placed in a constant temperature bath at 60° C., and polymerization was carried out for 6 hours in a nitrogen atmosphere at a stirrer speed of 350 rpm. After the reaction, an agglomerate was filtered off by a 100 mesh screen to give an AEP. This AEP was designated "Emulsion A", and was used in the Examples and Comparative Examples.

AUPDS·M

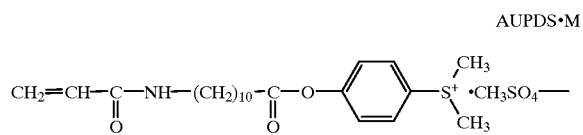

Manufacturing Example 13

An AEP was prepared as in Manufacturing Example 12 except that 2.68 g methacryloxyphenyldimethylsulfonium methylsulfate (MAPDS . M), shown below, was used instead of AUPDS. This AEP was designated "Emulsion B", and was used in the Examples.

MAPDS·M

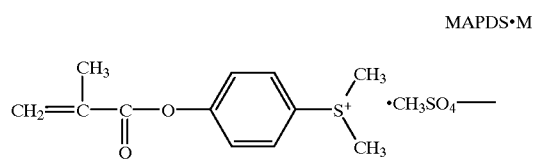

MAPDS . M

Manufacturing Example 14

An AEP was prepared according to Manufacturing Example 13 with the addition of 14.4 g butyl acrylate. This AEP was designated "Emulsion C", and was used in the Examples.

Manufacturing Example 15

An AEP was prepared according to Manufacturing Example 12 except that 2.68 g 4- (4-vinylbenzoyloxy) phenyldimethylsulfonium methylsulfate (VBPDS . M) shown below was used instead of AUPDS. This AEP was designated "Emulsion D", and was used in the Examples.

VBPD·M

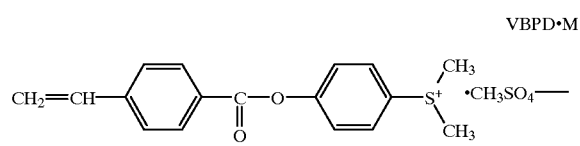

VBPD . M

Manufacturing Example 16

50 g water, 0.1 g ferrite-coated magnetic particles and 0.035 g p-10-undecenoyloxyphenyldimethylsulfonium methylsulfate (UPDS . M) shown below were introduced into a three-neck flask fitted with a mechanical stirrer, reflux tube and nitrogen inlet tube, ultrasonicallydispersed for 1 hour and stirred for6hours. 0.018 g dibutyl fumarate and 0.017 g styrene were added, and the resulting mixture stirred at 25° C. for 20 hours. Next, 0.007 g potassium persulfate (KPS) was added as initiator, and polymerization was carried out at 60° C. for 24 hours in a nitrogen atmosphere at a stirrer speed of 350 rpm. After the reaction, an agglomerate was filtered off by a 100 mesh screen to give an AEP composite emulsion. This AEP composite emulsion was designated "Emulsion E", and was used in the Examples and Comparative Examples.

UPDS·M

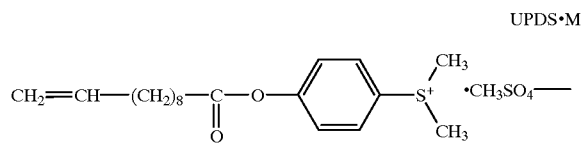

UPDS . M (2) Film-Forming Method of Examples

Example 29

A 0.3×30×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, dried in a current of air, dipped in an IPA solution of 1% isopropyltri(N-aminoethyl-aminoethyl) titanate ("Prenact KR44", AJINOMOTO Co.) for 2 minutes, and dried at room temperature to give a surface-treated piece. This surface-treated piece was dipped in a 5% aqueous solution of MAPDS for 15 seconds, rinsed with tap water, and dried in a hot air oven at 120° C. for 5 minutes to give a piece on which a film comprising an AEM (A) was formed.

Example 30

A film was formed according to Example 29 by another AEM (A), except that AUPDS was used instead of MAPDS.

Example 31

A film was formed according to Example 29 by another AEM (A), except that VBPDS was used instead of MAPDS.

Example 32

A film was formed according to Example 29 by another AEM (A), except that 1% AIBA was added to the 5% aqueous solution of MAPDS.

Example 33

A film was formed according to Example 29 by another AEM (A), except that 5% acrylic acid and 1% AIBA were added to the 5% aqueous solution of MAPDS.

Example 34

A 0.3×30×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, dried in a current of air, dipped in an IPA solution of 1% isopropyltri(N-aminoethyl-aminoethyl) titanate ("Prenact KR44", AJINOMOTO Co.) for 2 minutes, and dried at room temperature to give a surface-treated piece. This surface-treated piece was dipped in "Emulsion A" of Manufacturing Example 12 (20% N.V.) (C) for 15 seconds, rinsed with tap water, and dried in a hot air oven at 120° C. for 5 minutes to give a piece on which a film comprising an AEP (C) was formed.

Example 35

A film was formed according to Example 34 by another AEP-(C), except that "Emulsion B" was used instead of "Emulsion A".

Example 36

A film was formed according to Example 34 by another AEP (C), except that "Emulsion C" was used instead of "Emulsion A".

Example 37

A film was formed according to Example 34 by another AEP (C), except that "Emulsion D" was used instead of "Emulsion A".

Example 38

A film was formed according to Example 34 by another AEP (C), except that "Emulsion E" was used instead of "Emulsion A".

Example 39

A film was formed according to Example 34 by another AEP (C), except that an alumina plate was used instead of a SPCC steel plate.

Example 40

A film was formed according to Example 34 by another AEP (C), except that a copper plate was used instead of a SPCC steel plate.

Example 41

A film was formed according to Example 34 by another AEP (C), except that the surface-treated piece was dipped in a solution of ethylenediamine (EDA), which is a crosslinking agent, prior to heat drying.

Example 42

A 0.3×30×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, dried in a current of air, dipped in an IPA solution of 1% 3-mercaptopropyltrimethoxysilane ("SH6062", Toray-Dow Co.) for 2 minutes, and dried at room temperature to give a surface-treated piece. This surface-treated piece was dipped in "Emulsion A" of Manufacturing Example 12 (20% N.V.) for 15 seconds, rinsed with tap water, and dried in a hot air oven at 120° C. for 5 minutes to give a piece on which a film comprising an AEP (C) with a different coupling agent was formed.

Example 43

A film was formed according to Example 42 by another AEP (C), except that "Emulsion B" was used instead of "Emulsion A".

Example 44

A film was formed according to Example 42 by another AEP (C), except that "Emulsion C" was used instead of "Emulsion A".

Example 45

A film was formed according to Example 42 by another AEP (C), except that "Emulsion D" was used instead of "Emulsion A".

Example 46

A film was formed according to Example 42 by another AEP (C), except that "Emulsion E" was used instead of "Emulsion A".

Example 47

A 0.3×30 70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, and dried in a current of air. It was then anodized with a constant current in an aqueous solution of 2,4,6-trimercapto-s-triazin monosodium salt ('Santhiol N-1' Sankyo Kasei Co.) at a current density of 15 mA/cm$^2$ for 30 seconds, rinsed with ion exchange water, and dried in a current of air to give a surface-treated piece. This surface-treated piece was dipped in "Emulsion A" of Manufacturing Example 12 (20% N.V.) for 15 seconds, rinsed with tap water, and dried in a hot air oven at 120° C. for 5 minutes to give a piece on which a film comprising an AEP (C) with a different coupling agent was formed.

Example 48

A film was formed according to Example 47 another AEP (C), except that "Emulsion B" was used instead of "Emulsion A".

Example 49

A film was formed according to Example 47 by another AEP (C), except that "Emulsion C" was used instead of "Emulsion A".

Example 50

A film was formed according to Example 47 by another AEP (C), except that "Emulsion D" was used instead of "Emulsion A".

Example 51

A film was formed according to Example 47 by another AEP (C), except that "Emulsion E" was used instead of "Emulsion A".

Example 52

A film was formed according to Example 34 by another AEP (C), except that a zinc plate was used instead of a SPCC steel plate.

Example 53

A film was formed according to Example 34 by another AEP (C), except that a fusion galvanized steel plate was used instead of a SPCC steel plate, and "Emulsion B" was used instead of "Emulsion A".

Example 54

A 0.3×30×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, dried in a current of air, dipped in an IPA solution of 1% isopropyltri(N-aminoethyl-aminoethyl) titanate ("Prenact KR44", AJINOMOTO Co.) for 2 minutes, and dried at room temperature to give a surface-treated piece. This surface-treated piece was dipped in "Emulsion A" of Manufacturing Example 12 (20% N.V.), an electric current was passed at a voltage of 5V for 60 seconds, then the piece was rinsed with ion exchange water and dried in a hot air oven at 120° C. for 5 minutes to give a piece on which a film comprising an AEP (C) was formed.

Comparative Example 10

A film was formed according to Example 29, except that acrylic acid (AA) was used instead of MAPDS.

Comparative Example 11

A film was formed according to Example 29, except that acrylic acid (AA) was used instead of MAPDS and 1% AIBA was added to the aqueous solution of acrylic acid.

Comparative Example 12

A film was formed according to Example 29, except that 3-glycidoxypropylethoxysilane ("S510", CHISSO Co.) was used instead of isopropyltri(N-aminoethyl-aminoethyl) titanate ("PrenactKR44", AJINOMOTO Co.).

Comparative Example 13

A film was formed according to Example 32, except that 3-chloropropylethoxysilane ("S620", CHISSO Co.) was used instead of isopropyltri (N-aminoethyl-aminoethyl) titanate ("Prenact KR44", AJINOMOTO Co.).

Comparative Example 14

A film was formed according to Example 32, except that 3-glycidoxypropylethoxysilane ( "S510", CHISSO Co.) was used instead of isopropyltri(N-aminoethyl-aminoethyl) titanate ("PrenactKR44", AJINOMOTO Co.).

Comparative Example 15

A film was formed according to Example 34, except that 3-glycidoxypropylethoxysilane ("S510", CHISSO Co.) was used instead of isopropyltri(N-aminoethyl-aminoethyl) titanate ("PrenactKR44", AJINOMOTO Co.).

Comparative Example 16

A film was formed according to Example 42, except that 3-glycidoxypropylethoxysilane ("S510", CHISSO Co.) was used instead of isopropyltri(N-aminoethyl-aminoethyl) titanate ("Prenact KR44", AJINOMOTO Co.).

Comparative Example 17

A film was formed according to Example 34, except that 3-chloropropylethoxysilane ("S620", CHISSO Co.) was used instead of isopropyltri(N-aminoethyl-aminoethyl) titanate ("Prenact KR44", AJINOMOTO Co.).

Comparative Example 18

A film was formed according to Example 42, except that 3-chloropropylethoxysilane ( "S620", CHISSO Co.) was used instead of isopropyltri(N-aminoethyl-aminoethyl) titanate ("Prenact KR44", AJINOMOTO Co.).

Comparative Example 19

A film was formed according to Example 34, except that "NIPPE MICROGEL E-5003" (NIPPON PAINT Co., Ltd., crosslinking resin particles of n-butyl acrylate, particle diameter 60 nm) was used instead of "Emulsion A".

Comparative Example 20

A film was formed according to Example 41, except that "NIPPE MICROGEL E-5003" (NIPPON PAINT Co., Ltd., crosslinking resin particles of n-butyl acrylate, particle diameter 60 nm) was used instead of "Emulsion A".

Comparative Example 21

A film was formed according to Example 34, except that "NIPPE MICROGEL E-1001" (NIPPON PAINT Co., Ltd., crosslinking resin particles of styrene, particle diameter 100 nm) was used instead of "Emulsion A".

Comparative Example 22

A film was formed according to Example 41, except that "NIPPE MICROGEL E-1001" (NIPPON PAINT Co., Ltd., crosslinking resin particles of styrene, particle diameter 100 nm) was used instead of "Emulsion A" of Example 42.

Comparative Example 23

A film was formed according to Example 34, except that "NIPPE MICROGEL E-3101" (NIPPON PAINT Co., Ltd., crosslinking resin particles of styrene, particle diameter 300 nm) was used instead of "Emulsion A".

Comparative Example 24

A film was formed according to Example 41, except that "NIPPE MICROGEL E-3101" (NIPPON PAINT Co., Ltd., crosslinking resin particles of styrene, particle diameter 300 nm) was used instead of "Emulsion A".

Evaluation Method:

Adhesion test/Cross-cut adhesion test;

100 pieces of 1 mm squares were drawn on a coating by a cutter, cellophane tape was pressed onto the coating and then the tape was rapidly peeled off. The adhesion of the coating was evaluated by examining the coating and counting the number of remaining squares.

Anticorrosion Test;

A test piece was dipped in tap water, and the metal surface was examined for rust after 24 hours.

⊚: Rust less than 5% of total surface area

○: Rust less than 30% of total surface area

Δ: Rust less than 50% of total surface area

×: Rust equal to or greater than 50% of total surface area

The test results for the films of the above examples and comparative examples are shown in Tables 5 and 6.

TABLE 5

| Example | Metal material | Pretreatment agent | Film-forming Composition | Polymerization initiator or crosslinking agent | Evaluation test item | |
|---|---|---|---|---|---|---|
| | | | | | Adhesion | Anticorrosion |
| 29 | Iron | KR44 | MAPDS | — | 100 | ○ |
| 30 | Iron | KR44 | AUPDS | — | 100 | ○ |
| 31 | Iron | KR44 | VBPDS | — | 100 | ○ |
| 32 | Iron | KR44 | MAPDS | AIBA | 100 | ⊚ |
| 33 | Iron | KR44 | MAPDS AA | AIBA | 100 | ⊚ |
| 34 | Iron | KR44 | Emulsion A | — | 100 | ⊚ |
| 35 | Iron | KR44 | Emulsion B | — | 100 | ⊚ |
| 36 | Iron | KR44 | Emulsion C | — | 100 | ⊚ |
| 37 | Iron | KR44 | Emulsion D | — | 100 | ⊚ |
| 38 | Iron | KR44 | Emulsion E | — | 100 | ⊚ |
| 39 | Aluminum | KR44 | Emulsion A | — | 100 | ⊚ |
| 40 | Copper | KR44 | Emulsion A | — | 100 | ⊚ |
| 41 | Iron | KR44 | Emulsion A | EDA | 100 | ⊚ |
| 42 | Iron | SH6062 | Emulsion A | — | 82 | ○ |
| 43 | Iron | SH6062 | Emulsion B | — | 93 | ○ |
| 44 | Iron | SH6062 | Emulsion C | — | 85 | ○ |
| 45 | Iron | SH6062 | Emulsion D | — | 98 | ○ |
| 46 | Iron | SH6062 | Emulsion E | — | 80 | ○ |
| 47 | Iron | N-1 | Emulsion A | — | 82 | ○ |
| 48 | Iron | N-1 | Emulsion B | — | 98 | ○ |
| 49 | Iron | N-1 | Emulsion C | — | 91 | ○ |
| 50 | Iron | N-1 | Emulsion D | — | 87 | ○ |
| 51 | Iron | N-1 | Emulsion E | — | 81 | ○ |
| 52 | Zinc | KR44 | Emulsion A | — | 100 | ○ |
| 53 | Fusion galvanized steel plate | KR44 | Emulsion B | — | 100 | ○ |
| 54 | Iron | KR44 | Emulsion A | — | 100 | ⊚ |

TABLE 6

| Comparative Example | Metal material | Pretreatment Agent | Film-forming Composition | Polymerization initiator or crosslinking agent | Evaluation test item | |
|---|---|---|---|---|---|---|
| | | | | | Adhesion | Anticorrosion |
| 10 | Iron | KR44 | AA | — | Does not form film | × |
| 11 | Iron | KR44 | AA | AIBA | Does not form film | × |
| 12 | Iron | S510 | MAPDS | — | Does not form film | × |
| 13 | Iron | S620 | MAPDS | AIBA | Does not form film | × |
| 14 | Iron | S510 | MAPDS | AIBA | Does not form film | × |
| 15 | Iron | S510 | Emulsion A | — | Does not form film | × |
| 16 | Iron | S510 | Emulsion A | EDA | Does not form film | × |
| 17 | Iron | S620 | Emulsion A | — | Does not form film | × |
| 18 | Iron | S620 | Emulsion A | EDA | Does not form film | × |
| 19 | Iron | KR44 | Emulsion F | — | Does not form film | × |
| 20 | Iron | KR44 | Emulsion F | EDA | Does not form film | × |
| 21 | Copper | KR44 | Emulsion G | — | Does not form film | × |
| 22 | Iron | KR44 | Emulsion G | EDA | Does not form film | × |

TABLE 6-continued

| Comparative Example | Metal material | Pretreatment Agent | Film-forming Composition | Polymerization initiator or crosslinking agent | Evaluation test item | |
|---|---|---|---|---|---|---|
| | | | | | Adhesion | Anticorrosion |
| 23 | Iron | KR44 | Emulsion H | — | Does not form film | × |
| 24 | Iron | KR44 | Emulsion H | EDA | Does not form film | × |

Note:
Emulsion F: "NIPPE MICROGEL E-5503" (NIPPON PAINT Co., Ltd., crosslinking resin particles of n-butyl acrylate, particle diameter 60 nm)
Emulsion G: "NIPPE MICROGEL E-1001" (NIPPON PAINT Co., Ltd., crosslinking resin particles of styrene, particle diameter 100 nm)
Emulsion H: "NIPPE MICROGEL E-3101" (NIPPON PAINT Co., Ltd., corsslinking resin particles of styrene, particle diameter 300 nm)

Examples 55–70 and Comparative Examples 25–3
(1) (c) Method of Manufacturing Composition used in Film-forming step: Emulsion A–E are identical to the above manufacturing Examples.
(2) Film-Forming Method of Examples and Comparative Examples Example 55

A 0.3×30×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, and dried in a current of air. An electric current was passed through the plate in a 5% aqueous solution of MAPDS . M at a voltage of 5V for 60 seconds, then the plate was rinsed with tap water and dried in a hot air oven at 120° C. for 5 minutes to give a plate on which a film comprising an AEM (A) was formed.

Example 56

A film was formed according to Example 55 by another AEM (A), except that AUPDS . M was used instead of MAPDS .M.

Example 57

A film was formed according to Example 55 by another AEM (A), except that VBPDS . M was used instead of MAPDS . M.

Example 58

A film was formed according to Example 55 by another AEM (A), except that 1% AIBA was added to the 5% aqueous solution of MAPDS . M.

Example 59

A film was formed according to Example 55 by another AEM (A), except that 5% acrylic acid and 1% AIBA were added to the 5% aqueous solution of MAPDS . M.

Example 60

A 0. 3×3 ×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, and dried in a current of air. An electric current was pass ed through the plate in the "Emulsion A" (20% N.V.) at a voltage of 5V for 60 seconds, then the plate was rinsed with tap water and dried in a hot air oven at 120° C. for 5 minutes to give a plate on which a film comprising an AEP (C) was formed.

Example 61

A film was formed according to Example 60 by another AEP (C) , except that "Emulsion B" was used instead of "Emulsion A".

Example 62

A film was formed according to Example 60 by another AEP (C), except that "Emulsion C" was used instead of "Emulsion A".

Example 63

A film was formed according to Example 60 by another AEP (C), except that "Emulsion D" was used instead of "Emulsion A".

Example 64

A film was formed according to Example 60 by another AEP (C), except that "Emulsion E" was used instead of "Emulsion A".

Example 65

A film was formed according to Example 60 by another AEP (C), except that an alumina plate was used instead of a SPCC steel plate.

Example 66

A film was formed according to Example 60 by another AEP (C), except that a copper plate was used instead of a SPCC steel plate.

Example 67

A 0.3×30×70 mm SPCC steel plate (Nippon Test Panels Co.) was dipped in a 2% aqueous solution of degreasing agent ("SURFCLEANER T53", NIPPON PAINT Co., Ltd.) at 60° C. for 2 minutes, rinsed with tap water followed by ion exchange water, and dried in a current of air. The plate was dipped in the "Emulsion A" of Example 17 (20% N.V.) for 15 seconds, then the plate was rinsed with tap water and dried in a hot air oven at 120° C. for 5 minutes to give a plate on which 16* a film comprising an AEP (C) was formed.

Example 68

A film was formed according to Example 60 by another AEP (C), except that the plate was dipped in 2-methoxyethylamine (MEA), which is a crosslinking agent, prior to heat drying.

Example 69

A film was formed according to Example 60 by another AEP (C), except that a zinc plate was used instead of a SPCC steel plate.

Example 70

A film was formed according to Example 60 by another AEP (C), except that a fusion galvanized steel plate was used instead of the SPCC steel plate, and "Emulsion B" was used instead of "Emulsion A".

Comparative Example 25

A film was formed according to Example 55, except that acrylamide (AA) was used instead of MAPDS.

Comparative Example 26

A film was formed according to Example 55, except that acrylamide (AA) was used instead of MAPDS and 1% AIBA was added to the aqueous solution of acrylic acid.

Comparative Example 27

A film was formed according to Example 60, except that "NIPPE MICROGEL E-5003" (NIPPON PAINT Co., Ltd., crosslinking resin particles of n-butyl acrylate, particle diameter 60 nm) was used instead of "Emulsion A".

Comparative Example 28

A film was formed according to Example 68, except that "NIPPE MICROGEL E-5003" (NIPPON PAINT Co., Ltd., crosslinking resin particles of n-butyl acrylate, particle diameter 60 nm) was used instead of "Emulsion A".

Comparative Example 29

A film was formed according to Example 60, except that "NIPPE MICROGEL E-1001" (NIPPON PAINT Co., Ltd., crosslinking resin particles of styrene, particle diameter 100 nm) was used instead of "Emulsion A".

Comparative Example 30

A film was formed according to Example 68, except that "NIPPE MICROGEL E-1001" (NIPPON PAINT Co., Ltd., crosslinking resin particles of styrene, particle diameter 100 nm) was used instead of "Emulsion A".

Comparative Example 31

A film was formed according to Example 60, except that "NIPPE MICROGEL E-3101" (NIPPON PAINT Co., Ltd., crosslinking resin particles of styrene, particle diameter 300 nm) was used instead of "Emulsion A".

Comparative Example 32

A film was formed according to Example 68, except that "NIPPE MICROGEL E-3101" (NIPPON PAINT Co., Ltd., crosslinking resin particles of styrene, particle diameter 300 nm) was used instead of "Emulsion A".

Evaluation Method:

Adhesion test/Crosscut adhesion test;

100 pieces of 1 mm squares were drawn on a coating by a cutter, cellophane tape was pressed onto the coating and then the tape was rapidly peeled off. The adhesion of the coating was evaluated by examining the coating and counting the number of remaining squares.

(b) Anticorrosion test;

A test piece was dipped in tap water, and the metal surface was examined for rust after 24 hours.

⊚: Rust less than 5% of total surface area
○: Rust less than 30% of total surface area
Δ: Rust less than 50% of total surface area
×: Rust equal to or greater than 50% of total surface area The evaluation results for the films of the above examples and comparative examples are shown in Tables 7 and 8.

TABLE 7

| Example | Metal material | Current density (mA/cm$^2$) | Film-forming composition | Polymerization initiator or crosslinking agent | Adhesion | Anticorrosion |
|---|---|---|---|---|---|---|
| 55 | Iron | 15 | MAPDS | — | 100 | ○ |
| 56 | Iron | 15 | AUPDS | — | 100 | ○ |
| 57 | Iron | 15 | VBPDS | — | 100 | ○ |
| 58 | Iron | 15 | MAPDS | AIBA | 100 | ○ |
| 59 | Iron | 15 | MAPDS + AA | AIBA | 100 | ○ |
| 60 | Iron | 15 | Emulsion A | — | 100 | ⊚ |
| 61 | Iron | 15 | Emulsion B | — | 100 | ⊚ |
| 62 | Iron | 15 | Emulsion C | — | 100 | ⊚ |
| 63 | Iron | 15 | Emulsion D | — | 100 | ⊚ |
| 64 | Iron | 15 | Emulsion E | — | 100 | ⊚ |
| 65 | Alnmiunm | 15 | Emulsion A | — | 100 | ⊚ |
| 66 | Copper | 15 | Emulsion A | — | 100 | ⊚ |
| 67 | Iron | — | Emulsion A | — | 100 | ○ |
| 68 | Iron | 15 | Emulsion A | MEA | 100 | ⊚ |
| 69 | Zinc | 15 | Emulsion A | — | 100 | ⊚ |
| 70 | Fusion galvanized steel plate | 15 | Emulsion B | — | 100 | ⊚ |

TABLE 8

| Example | Metal material | Current density (mA/cm$^2$) | Film-forming composition | Polymerization initiator or crosslinking agent | Evaluation test item | |
|---|---|---|---|---|---|---|
| | | | | | Adhesion | Anticorrosion |
| 25 | Iron | 15 | AA | — | Dose not form film | × |
| 26 | Iron | 15 | AA | AIBA | Dose not form film | × |
| 27 | Iron | 15 | Emulsion F | — | Dose not form film | × |
| 28 | Iron | 15 | Emulsion F | MEA | Dose not form film | × |
| 29 | Iron | 15 | Emulson G | — | Dose not form film | × |
| 30 | Iron | 15 | Emulsion G | — | Dose not form film | × |
| 31 | Iron | 15 | Emulsion H | — | Dose not form film | × |
| 32 | Iron | 15 | Emulsion H | MEA | Dose not form film | × |

Note:
Emulsion F: "NIPPE MICROGEL E-5003" (NIPPON PAINT Co., Ltd., crosslinking resin particles of n-butyl acrylate, particle diameter 60 nm)
Emulsion G: "NIPPE MICROGEL E-3101" (NIPPON PAINT Co., Ltd., crosslinking resin particles of styrene, particle diameter 300 nm)

From these results, it is clear that according to the film-forming method of this invention, a coating with superior anticorrosion properties and adhesion is obtained.

Hence, the film-forming method of this invention permits an organic film or organic film/inorganic film having superior anticorrosion properties and adhesion to be formed on a metal surface without the use of harmful substances such as phosphorus or chromium compounds. Moreover, sludge is not produced, and an inhibitor effect due to side products may be expected.

What is claimed:

1. A film-forming method comprising a metal surface treatment and film-forming step wherein a metal surface is first treated to enhance adhesion and anti-corrosive properties of a later-formed film and wherein said film is immediately formed on the treated surface by bringing an aqueous solution comprising at least one composition into contact with a metal material so that the solution reacts directly with the metal and chelates to the metal to form an anti-corrosive film, wherein said at least one composition is one of the following compositions (A), (B), (C) or (D):

(A) a monomer comprising a sulfonium group at one end of the molecule, (B) a water-soluble polymer obtained by homopolymerization or copolymerization of said monomer (A), (C) an emulsion or water-soluble polymer comprising a sulfonium group obtained by copolymerization of said monomer (A) and a radical-polymerizable unsaturated monomer excluding said monomer (A), (D) a composite emulsion comprising a sulfonium group wherein inorganic particle core are coated by a layer comprising a copolymer of said monomer (A) and a radical-polymerizable unsaturated monomer excluding said monomer (A).

2. A film-forming method as defined in claim 1, wherein said monomer (A) comprises a sulfonium group at one end of the molecule, and is a monomer having the following general formula (a):

$$Y-W-X \qquad (a)$$

wherein Y is an aromatic ring comprising a benzene ring, a naphthalene ring or a pyridine ring having a polymerizable unsaturated group and/or active hydrogen, and/or a straight chain or branched aliphatic group having a polymerizable unsaturated group and or active hydrogen, W is a sulfonium group and X is a counter anion selected from the group consisting of the following formulas:

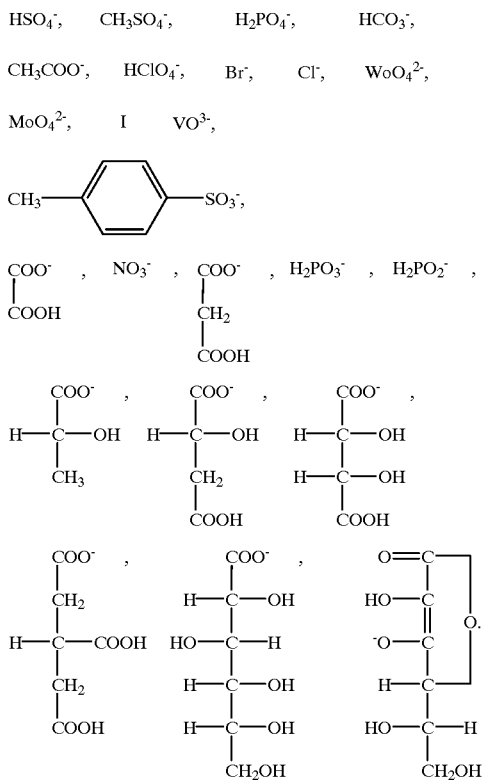

3. A film-forming method as defined in claim 1, wherein said monomer (A) comprises a sulfonium group at one end of the molecule, and is a monomer having the following general formula (I) comprising an active ester group in the same molecule:

(I)
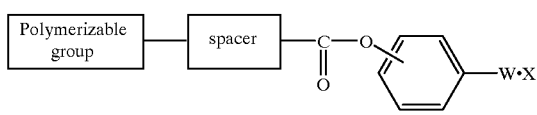
wherein W is a sulfonium group and X is a counter anion selected from the group consisting of the following formulas:
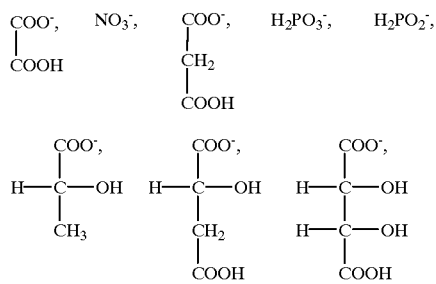
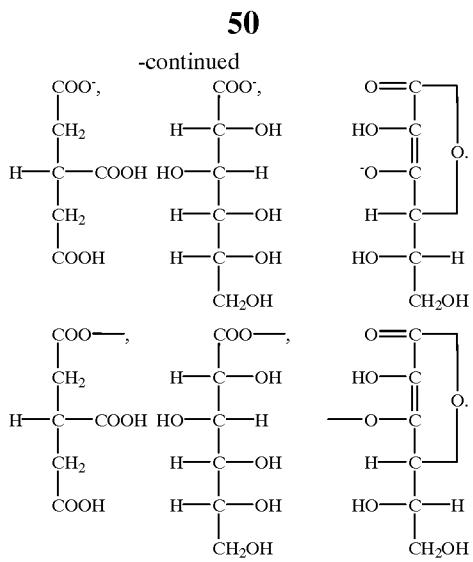
4. A film-forming method as defined in claim 1, wherein said monomer (A) comprises a sulfonium group at one end of the molecule, and is a monomer having the following formula (II-1), (II-2), (II-3), (III-1), (III-2), (III-3), or (III-4):
(II-1)
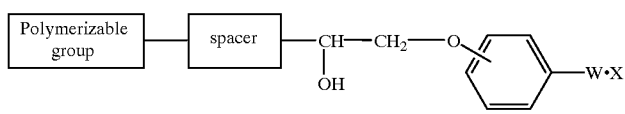
(II-2)
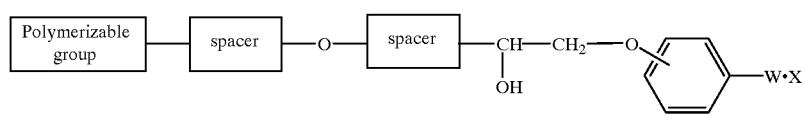
(II-3)
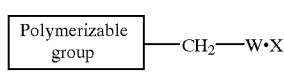
(III-1)
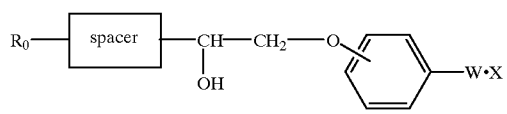
(III-2)
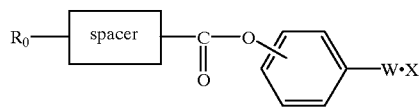
(III-3)
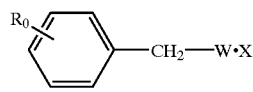
(III-4)
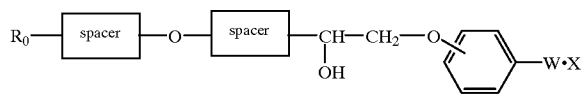

wherein W is a sulfonium group, $R_0$ is methyl or hydroxyl and X is a counter anion selected from the group consisting of the following formulas: $HSO_4^-$, $CH_3SO_4^-$, $H_2PO_4^-$, $HCO_3^-$, $CH_3COO^-$, $HClO_4^-$, $Br^-$, $Cl^-$, $WoO_4^{2-}$, $MoO_4^{2-}$, $I^-$, $VO^{3-}$,

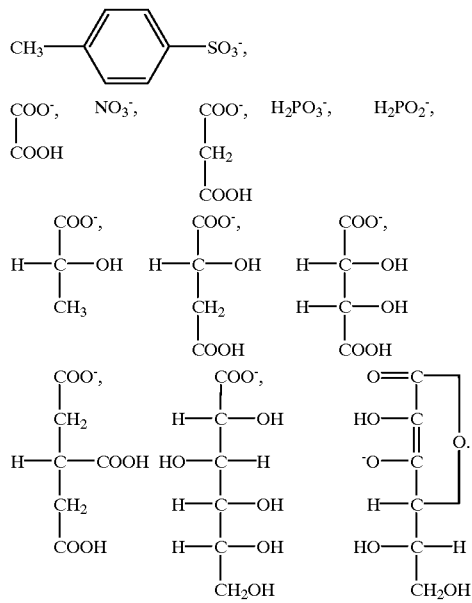

5. A film-forming method as defined in claim 1, wherein said monomer (A) comprises a sulfonium group at one end of the molecule, and is a monomer having the following general formula (I) comprising an active ester group in the same molecule:

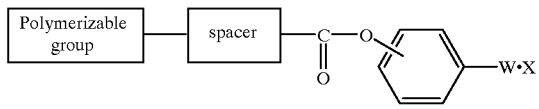

(I)

the Polymerizable group is selected from the group consisting of the following formulas:

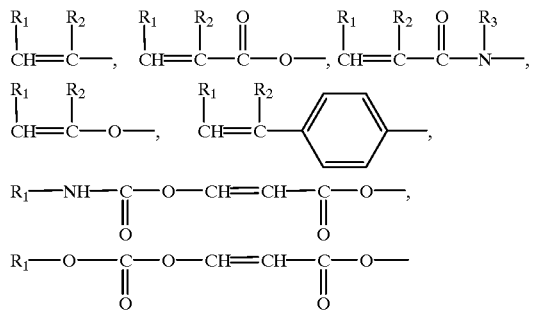

where $R_1$, $R_2$, $R_3$ are hydrogen, phenyl, hydroxyl or $C_1$–$C_4$ alkyl and may be identical or different;

the Spacer is selected from the group consisting of the following formulas:

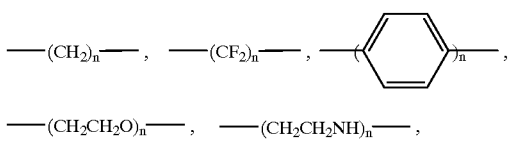

where n=an integer from 0 to 18;

W=sulfonium group selected from the group consisting of the following formulas:

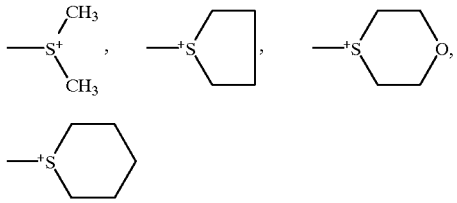

and X=counter anion selected from the group consisting of the following formulas:

$X=X_1$; $HSO_4^-$, $CH_3SO_4^-$, $H_2PO_4^-$, $HCO_3^-$, $CH_3COO^-$ $HClO_4^-$, $Br^-$, $Cl^-$, $WoO_4^{2-}$, $MoO_4^{2-}$, $I^-$, $VO^{3-}$,

6. A film-forming method as defined in claim 1, wherein said monomer (A) comprises a sulfonium group at one end of the molecule, and is a monomer having the following general formula (I) or (III-2) comprising an active ester group in the same molecule:

(I)

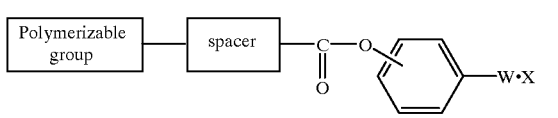

wherein W is a sulfonium group and X is a counter anion selected from the group consisting of the following formulas:

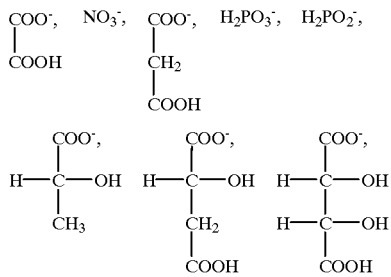

-continued

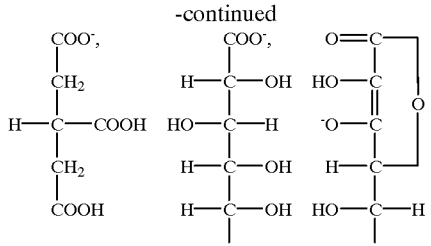

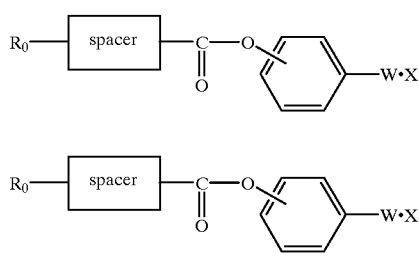 (III-2)

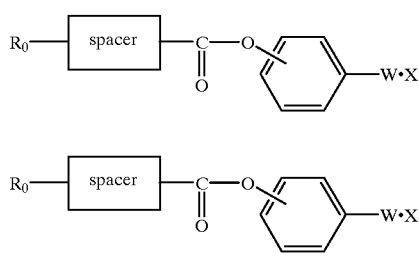 (III-2)

wherein W is a sulfonium group and X is a counter anion selected from the group consisting of the following formulas:

$HSO_4^-$, $CH_3SO_4^-$, $H_2PO_4^-$, $HCO_3^-$, $CH_3COO^-$ $HClO_4^-$, $Br^-$, $Cl^-$, $WoO_4^{2-}$, $MoO_4^{2-}$, $I^-$, $VO^{3-}$,

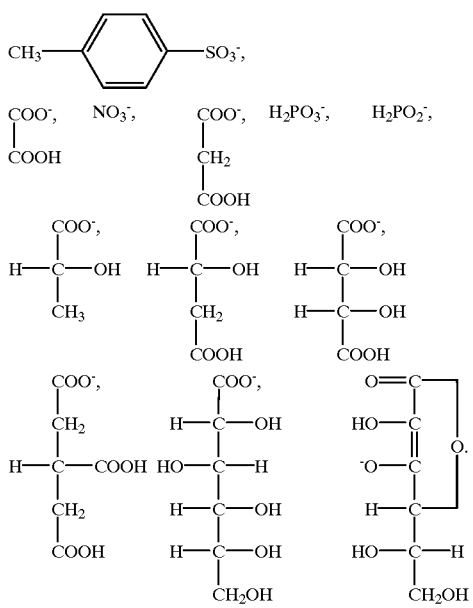

7. A film-forming method as defined in claim 3, wherein said polymerizable group of said monomer (A) is selected from the group consisting of the following general formulae:

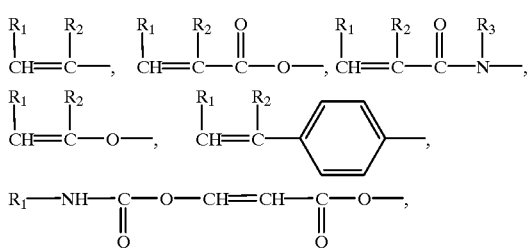

-continued

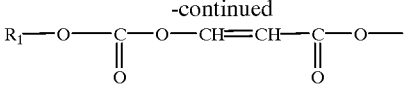

where $R_1$, $R_2$, $R_3$ are hydrogen, phenyl, hydroxyl or $C_1-C_4$ allyl and may be identical or different;

and the Spacer of said monomer (A) is selected from the group consisting of the following formulas:

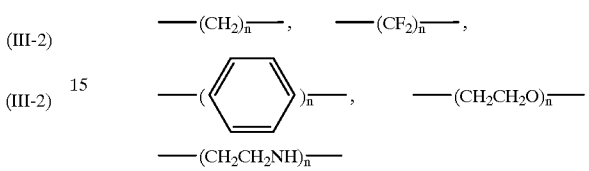

where n=an integer from 0 to 18.

8. A film-forming method as defined in claim 2, wherein said sulfonium group W of said monomer (A) has the following general formula:

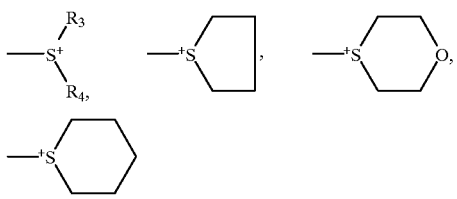

where $R_3$, $R_4$ are phenyl, hydroxyl or $C_1-C_4$ alkyl and may be identical or different.

9. A film-forming method as defined in claim 1, wherein said monomer (A) is a monomer having the following structural formula:

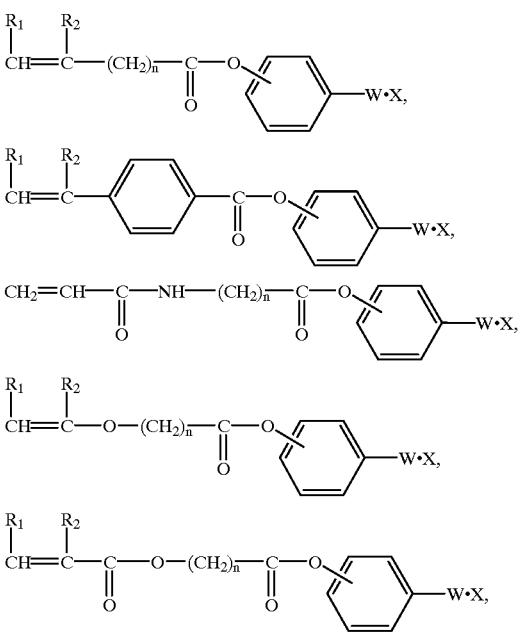

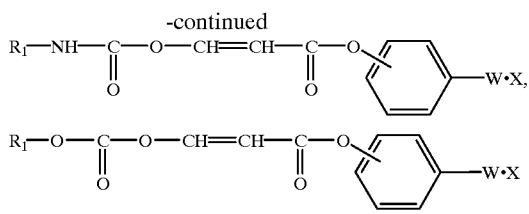

where $R_1$, $R_2$, are hydrogen, phenyl, hydroxyl or $C_1$–$C_4$ alkyl and may be identical or different;

n=1 to 17;

W is a sulfonium group selected from the group consisting of the following formulas:

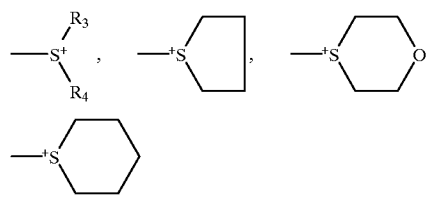

where $R_3$, $R_4$ are phenyl, hydroxyl or $C_1$–$C_4$ alkyl and may be identical or different, and X is a counter anion selected from the group consisting of the following formulas:

$HSO_4^-$, $CH_3SO_4^-$, $H_2PO_4^-$, $HCO_3^-$, $CH_3COO^-$ $HClO_4^-$, $Br^-$, $Cl^-$, $WoO_4^{2-}$, $MoO_4^{2-}$, $I^-$, $VO^{3-}$,

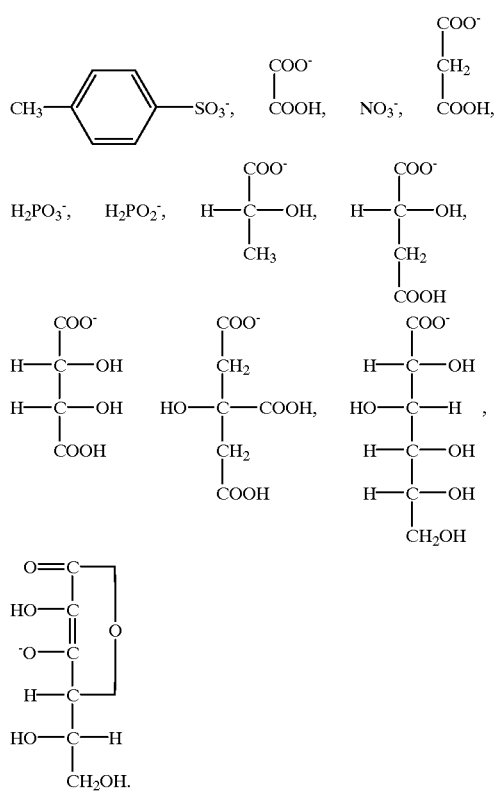

10. A film-forming method as defined in claim 1, wherein said monomer (A) is a monomer having the following formula;

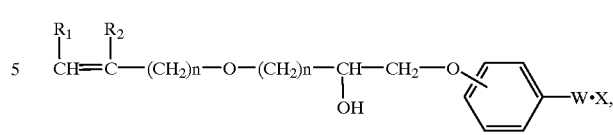

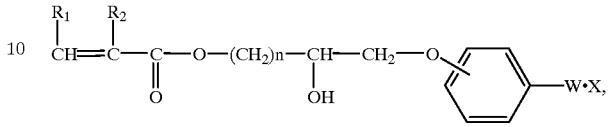

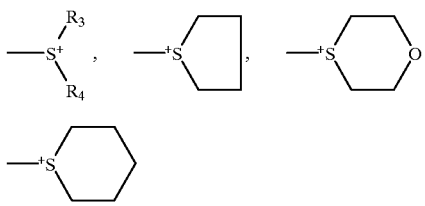

where $R_1$, $R_2$ are hydrogen, phenyl, hydroxyl or $C_1$–$C_4$ alkyl and may be identical or different;

n=0 to 17;

W is a sulfonium group selected from the group consisting of the following formulas:

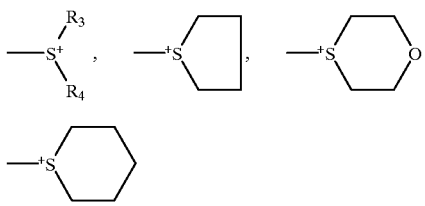

where $R_3$, $R_4$ are phenyl, hydroxyl or $C_1$–$C_4$ alkyl and may be identical or different, and X is a counter anion selected from the group consisting of the following formulas:

$HSO_4^-$, $CH_3SO_4^-$, $H_2PO_4^-$, $HCO_3^-$, $CH_3COO^-$ $HClO_4^-$, $Br^-$, $Cl^-$, $WoO_4^{2-}$, $MoO_4^{2-}$, $I^-$, $VO^{3-}$,

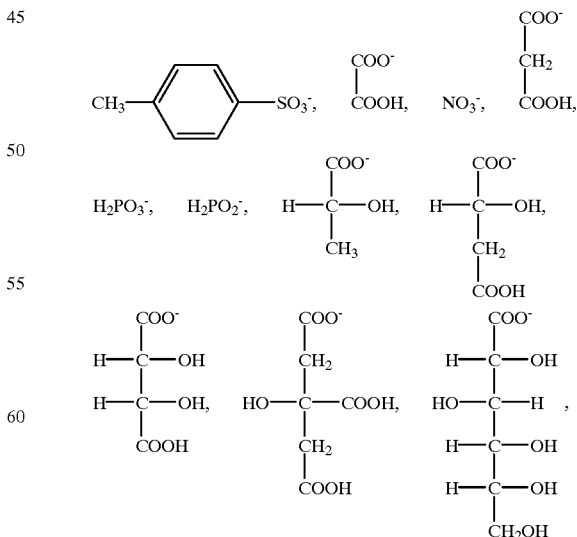

-continued

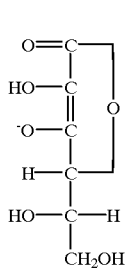

11. A film-forming method as defined in claim 1, wherein said monomer (A) is a monomer having any of the following structural formulae:

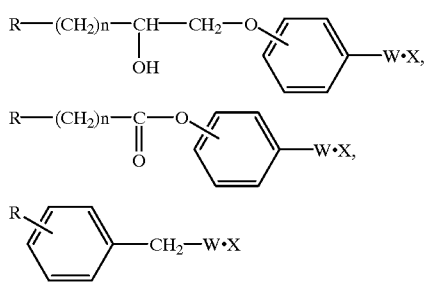

where $R_1$, $R_2$ are hydrogen, phenyl, hydroxyl or $C_1$–$C_4$ alkyl and may be identical or different;

n=0 to 17;

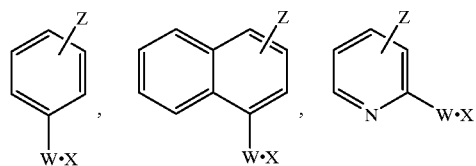

where Z=OH, COOH, $NH_2$

W=sulfonium group selected from the group consisting of the following formulas:

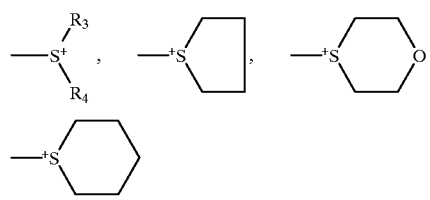

where $R_3$, $R_4$ are phenyl, hydroxyl or $C_1$–$C_4$ alkyl and may be identical or different, and X is a counter anion selected from the group consisting of the following formulas:

$HSO_4^-$, $CH_3SO_4^-$, $H_2PO_4^-$, $HCO_3^-$, $CH_3COO^-$ $HClO_4^-$, $Br^-$, $Cl^-$, $WoO_4^{2-}$, $MoO_4^{2-}$, $I^-$, $VO^{3-}$,

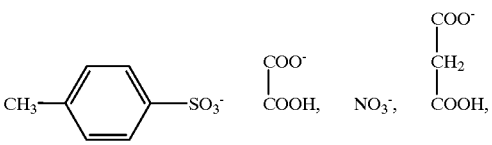

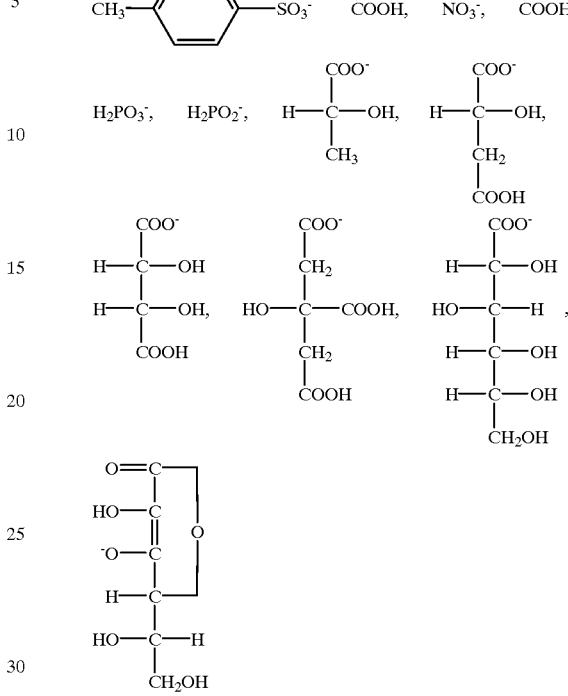

12. A film-forming method as defined in claim 1, wherein said metal material is degreased in said degreasing step prior to said film-forming step.

13. A film-forming method as defined in claim 12, wherein said degreasing step and a pretreatment step using a mercapto coupling agent are performed prior to said film-forming step.

14. A film-forming method as defined in claim 12, wherein said degreasing treatment is treatment by an inorganic acid.

15. A film-forming method as defined in claim 12, wherein said degreasing step and a pretreatment step using an oxycarboxylic acid compound or an ascorbic acid compound are performed prior to said film-forming step.

16. A film-forming method as defined in claim 15, where an inorganic acid or an acid compound used in said pretreatment step is hydrochloric acid, sulfuric acid, nitric acid, perchloric acid, tartaric acid, malic acid, citric acid, lactic acid, or gluconic acid, or an ammonium salt of any of these acids.

17. A film-forming method as defined in claim 1, wherein said film-forming step is a step for forming a film by dipping in, or the spraying, spin-coating, roll coating or bar coating of, any of said compositions (A), (B), (C) or (D).

18. A film-forming method as defined in claim 1, wherein said film-forming step is a step for forming a film by dipping said metal material in an aqueous solution comprising at least one of the above compositions (A), (B), (C) or (D), and electrodepositing said composition by passing a current between a cathode and an anode with the metal material as cathode.

* * * * *